(12) United States Patent
Longardner et al.

(10) Patent No.: US 10,937,316 B2
(45) Date of Patent: Mar. 2, 2021

(54) LIGHTING FIXTURE DATA HUBS AND SYSTEMS AND METHODS TO USE THE SAME

(71) Applicants: ECO Lighting Solutions, LLC, Indianapolis, IN (US); William Longardner, Indianapolis, IN (US); Jeffrey Pinyot, Fishers, IN (US)

(72) Inventors: William Longardner, Indianapolis, IN (US); Jeffrey Pinyot, Fishers, IN (US); Jason Toschlog, Noblesville, IN (US); Gage Toschlog, Noblesville, IN (US); Evan Foote, Noblesville, IN (US); Scott Whitlock, Fishers, IN (US); Andrew Huffman, Noblesville, IN (US); Daniel Hughes, Fishers, IN (US)

(73) Assignee: Eco Parking Technologies, LLC, Indianapolis, IN (US)

( * ) Notice: Subject to any disclaimer, the term of this patent is extended or adjusted under 35 U.S.C. 154(b) by 0 days.

(21) Appl. No.: 15/740,649

(22) PCT Filed: Jun. 29, 2016

(86) PCT No.: PCT/US2016/040143
§ 371 (c)(1),
(2) Date: Dec. 28, 2017

(87) PCT Pub. No.: WO2017/004235
PCT Pub. Date: Jan. 5, 2017

(65) Prior Publication Data
US 2018/0190117 A1    Jul. 5, 2018

Related U.S. Application Data

(60) Provisional application No. 62/301,320, filed on Feb. 29, 2016, provisional application No. 62/186,101, filed on Jun. 29, 2015.

(51) Int. Cl.
*G08G 1/017* (2006.01)
*G08G 1/14* (2006.01)
(Continued)

(52) U.S. Cl.
CPC .......... *G08G 1/142* (2013.01); *G07F 17/246* (2013.01); *G08G 1/017* (2013.01); *G08G 1/144* (2013.01);
(Continued)

(58) Field of Classification Search
CPC ........ G08G 1/142; G08G 1/042; G01S 15/88; Y02B 20/46
(Continued)

(56) References Cited

U.S. PATENT DOCUMENTS 5,414,624 A * 5/1995 Anthonyson ...... G06Q 30/0284
235/378
5,688,357 A   11/1997 Hanawa
(Continued)

FOREIGN PATENT DOCUMENTS

EP      2940670         11/2015
WO  2000/047794 A1      8/2000
(Continued)

OTHER PUBLICATIONS

International Searching Authority, International Search Report, PCT/US2016/040143, dated Sep. 19, 2016.
(Continued)

*Primary Examiner* — Qutbuddin Ghulamali
(74) *Attorney, Agent, or Firm* — Reichel Stohry Dean LLP; Mark C. Reichel; Natalie J. Dean

(57) ABSTRACT

Lighting fixture data hubs and systems and methods for use. An exemplary data hub comprises an annunciator configured to generate indications; a sensor configured to detect a zone comprising a plurality of parking spaces and to determine
(Continued)

whether or not one or more vehicles and/or one or more pedestrians are present, the sensor further configured to emit one or more signals corresponding to said detection; a processor in communication with the annunciator and the sensor, the processor configured to receive the one or more signals from the sensor and operable to direct the annunciator to generate an indication in response to the signal; and a sensor unit housing having at least portions of the annunciator, the sensor, and the processor located therein, the sensor unit configured to attach to a device such that power supplied to the device is also used to supply power to the data hub.

20 Claims, 26 Drawing Sheets

(51) Int. Cl.
    *G07F 17/24*     (2006.01)
    *H05B 47/11*     (2020.01)
    *H05B 47/105*     (2020.01)
    *G08G 1/042*     (2006.01)
    *G01S 15/88*     (2006.01)

(52) U.S. Cl.
    CPC ........... *G08G 1/146* (2013.01); *H05B 47/105* (2020.01); *H05B 47/11* (2020.01); *G01S 15/88* (2013.01); *G08G 1/042* (2013.01); *Y02B 20/40* (2013.01)

(58) Field of Classification Search
    USPC ....................................................... 340/932.2
    See application file for complete search history.

(56) References Cited

U.S. PATENT DOCUMENTS

| | | | |
|---|---|---|---|
| 6,147,624 A | 11/2000 | Clapper | |
| 6,292,110 B1 | 9/2001 | Budnovitch | |
| 6,642,854 B2 | 11/2003 | McMaster | |
| 7,855,661 B2 | 12/2010 | Ponert | |
| 8,232,745 B2 | 7/2012 | Chemel et al. | |
| 8,540,398 B2 | 9/2013 | Harris | |
| 8,723,689 B2 | 5/2014 | Mimeault | |
| 2004/0145491 A1 | 7/2004 | Nascimento | |
| 2005/0103116 A1 | 5/2005 | Kopp | |
| 2007/0050240 A1 | 3/2007 | Belani et al. | |
| 2007/0210935 A1* | 9/2007 | Yost | G07B 15/02 340/932.2 |
| 2011/0203638 A1 | 8/2011 | O'Neill | |
| 2011/0227531 A1 | 9/2011 | Rajakaruna | |
| 2012/0044350 A1 | 2/2012 | Verfuerth | |
| 2012/0155712 A1 | 6/2012 | Paul et al. | |
| 2013/0061257 A1* | 3/2013 | Takaya | H04H 60/45 725/10 |
| 2013/0329434 A1 | 12/2013 | Packard et al. | |
| 2014/0112101 A1* | 4/2014 | Rodrich | G01S 15/86 367/93 |
| 2014/0167912 A1 | 6/2014 | Snyder et al. | |
| 2014/0294634 A1* | 10/2014 | Crowsley | F04B 43/1253 417/476 |
| 2014/0322086 A1 | 10/2014 | Chak | |
| 2015/0016158 A1 | 1/2015 | Paik | |
| 2015/0028750 A1* | 1/2015 | Chen | H05B 47/105 315/152 |
| 2015/0293504 A1* | 10/2015 | Blum | H05B 47/12 700/90 |
| 2015/0296599 A1* | 10/2015 | Recker | H05B 47/105 315/153 |
| 2016/0253748 A1* | 9/2016 | Levy | G06Q 10/02 705/13 |

FOREIGN PATENT DOCUMENTS

| | | |
|---|---|---|
| WO | 2015/033256 A1 | 3/2015 |
| WO | 2015/059691 A1 | 4/2015 |

OTHER PUBLICATIONS

International Searching Authority, Written Opinion of the International Searching Authority, PCT/US2016/040143, dated Sep. 19, 2016.

Delibaltov, Diana et al., "Parking Lot Occupancy Determination from Lamp-Post Camera Images," 2013 16th International IEEE Conference on Intelligent Transportation Systems (ITSC), Conference Date Oct. 6-9, 2013, Publisher IEEE, Kurhaus, The Hague, The Netherlands.

Lee, Sangwon, et al., "Intelligent Parking Lot Application Using Wireless Sensor Networks," International Symposium on Collaborative Technologies and Systems (CTS), 2008, Conference Dates May 19-23, 2008, Publisher IEEE, pp. 48-57.

O'Malley, Lynda, "Smart Lighting: The Gateway to the Commected Home and IOT Markets," https://www.marsdd.com/news-and-insights/smart-lighting-the-gateway-to-the-connected-home-and-iot-markets/, Dated Sep. 29, 2015.

Repas, Robert, "Wireless Sensor Network Aids Travelers in Parking Their Cars and Trucks," http://www.machinedesign.com/technologies/wireless-sensor-network-aids-travelers-parking-their-cars-and-trucks, Dated Sep. 8, 2009.

\* cited by examiner

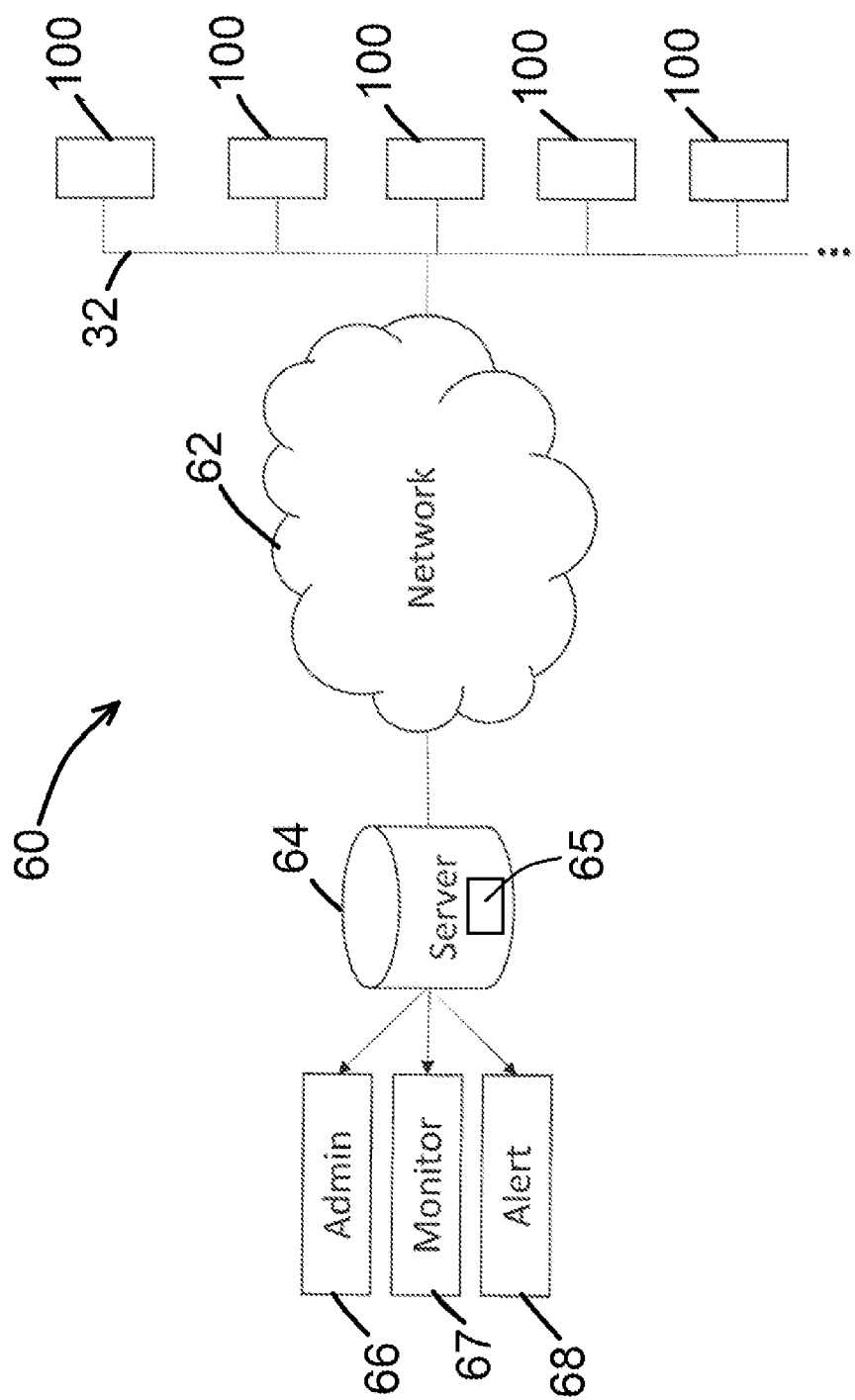

| Current LED Output Power  Default Settings: OFF = 0 LOW = 25% HIGH = 100% | Ambient Light Value  Default Settings: HIGH = 45 FC NEUTRAL = 35 FC | Motion Timer Active  Default Settings: YES = Within 5 Minutes of Motion | Set Output Power  Default Settings: OFF = 0 LOW = 25% HIGH = 100% |
|---|---|---|---|
| OFF | >= HIGH | YES | OFF |
| OFF | >= HIGH | NO | OFF |
| LOW | >= HIGH | YES | OFF |
| LOW | >= HIGH | NO | OFF |
| HIGH | >= HIGH | YES | OFF |
| HIGH | >= HIGH | NO | OFF |
| OFF | >= NEUTRAL < HIGH | YES | OFF |
| OFF | >= NEUTRAL < HIGH | NO | OFF |
| LOW | >= NEUTRAL < HIGH | YES | LOW |
| LOW | >= NEUTRAL < HIGH | NO | LOW |
| HIGH | >= NEUTRAL < HIGH | YES | HIGH |
| HIGH | >= NEUTRAL < HIGH | NO | LOW |
| OFF | < NEUTRAL | YES | HIGH |
| OFF | < NEUTRAL | NO | LOW |
| LOW | < NEUTRAL | YES | HIGH |
| LOW | < NEUTRAL | NO | LOW |
| HIGH | < NEUTRAL | YES | HIGH |
| HIGH | < NEUTRAL | NO | LOW |

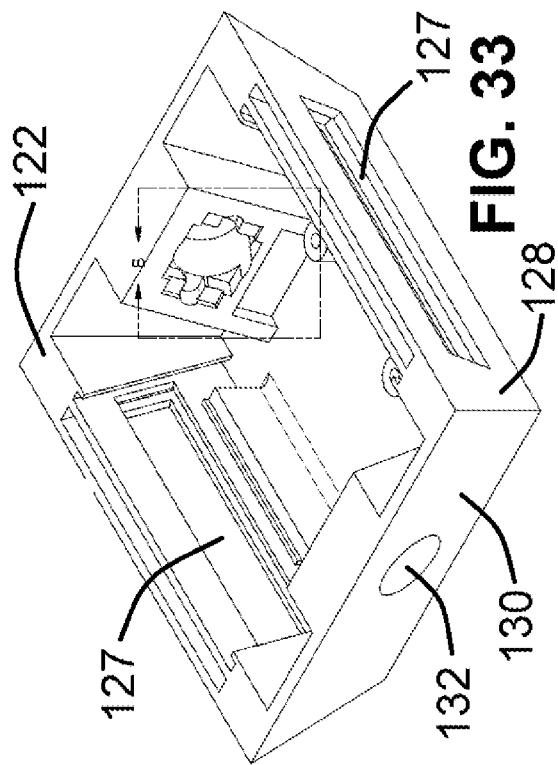
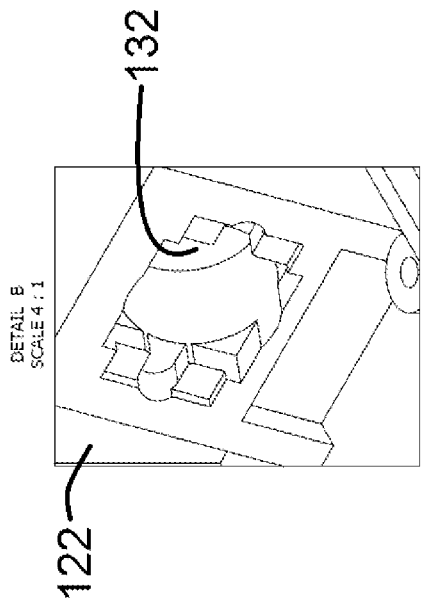
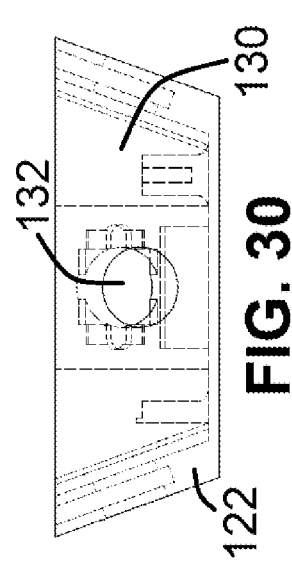
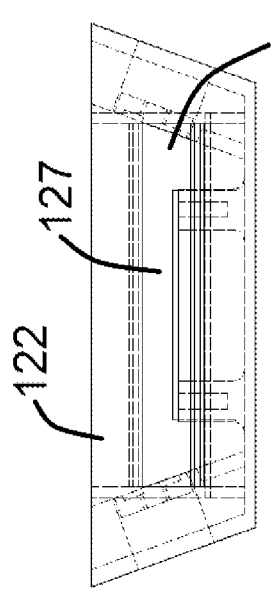
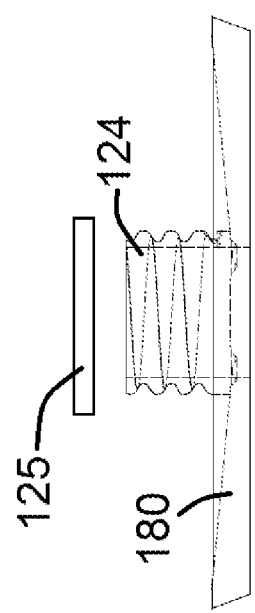

LIGHTING FIXTURE DATA HUBS AND SYSTEMS AND METHODS TO USE THE SAME

PRIORITY

The present application is related to, claims the priority benefit of, and is U.S. 35 U.S.C. 371 national stage patent application of, International Patent Application Serial No. PCT/US2016/040143, filed Jun. 29, 2016, which is related to, and claims the priority benefit of, U.S. Provisional Patent Application Ser. No. 62/186,101, filed on Jun. 29, 2015, and U.S. Provisional Application Ser. No. 62/301,320, filed on Feb. 29, 2016, the contents of which are hereby incorporated by reference in their entirety into this disclosure.

TECHNICAL FIELD

The present disclosure generally relates to wide area lighting fixtures and, more specifically, to lighting fixtures enabling data communication with a network.

BACKGROUND

Parking guidance, way-finding, occupancy status, auto-pay and other client-based systems, often referred to as parking commerce systems (PCS), are becoming more desirous among parking facility owners and operators to support their efforts to maximize their financial investment. Generally, a PCS provides drivers of vehicles guidance on where available (i.e., open) parking spaces are located within a parking facility by aisle or floor using visual cues or message boards, and may include other information. Commonly such systems involve various types of vehicle sensing and monitoring and are often installed as standalone units in a parking facility. Because the PCS needs to transmit and/or receive data and information obtained from field located sensors, power is needed to accomplish these tasks. The necessarily extensive wired infrastructure of such systems can be very cumbersome to retrofit in existing parking facilities. The infrastructure required to bring power to each sensor and indicator typically includes separate wiring, rigid conduit, J-boxes, hangers, etc. This infrastructure can push the cost upwards of $500.00 per space and often is the deciding factor in whether a system is economically justifiable and a worthy investment. Often a PCS using past methodologies may not scale to large parking facilities and consequently is not deployed in such applications. Accordingly, a need exists for a solution to lower the cost of the implementing parking commerce systems.

BRIEF DESCRIPTION

The present disclosure includes disclosure of a data hub comprising an annunciator configured to generate a first indication and a second indication; a sensor configured to detect a zone comprising a plurality of parking spaces in a vicinity of the data hub and to determine whether or not one or more vehicles and/or one or more pedestrians are present within the zone, the sensor further configured to emit one or more signals corresponding to said detection; a processor in communication with the annunciator and the sensor, the processor configured to receive the one or more signals from the sensor and operable to direct the annunciator to generate the first indication or the second indication in response to the signal; and a sensor unit housing having at least portions of the annunciator, the sensor, and the processor located therein, the sensor unit configured to attach to a device such that power supplied to the device is also used to supply power to the data hub. In various embodiments, the first indication is emitted light of a first color, and wherein the second indication is emitted light of a second color. In various embodiments, the first indication is emitted red light, and wherein the second indication is emitted green light. In various embodiments, when at least one of the one or more signals corresponds to the detection of a vehicle in each parking space of the plurality of parking spaces, the processor is operable to direct the annunicator to generate the first indication. In various embodiments, when at least one of the one or more signals corresponds to the detection of a vehicle in each parking space of the plurality of parking spaces, the processor is operable to direct the annunicator to generate the first indication of emitted red light. In various embodiments, when at least one of the one or more signals corresponds to the detection of a lack of a vehicle in at least one parking space of the plurality of parking spaces, the processor is operable to direct the annunicator to generate the second indication. In various embodiments, when at least one of the one or more signals corresponds to the detection of a lack of a vehicle in at least one parking space of the plurality of parking spaces, the processor is operable to direct the annunicator to generate the second indication of emitted green light.

In various embodiments, an exemplary data hub further comprises a data controller in communication with the processor and configured to receive the at least one signal from the sensor, the data controller further configured to interrogate the at least one signal and to communicate the interrogated at least one signal to the processor. In various embodiments, the processor further comprises a data controller configured to interrogate the at least one signal. In various embodiments, an exemplary data hub further comprises a light source in communication with the processor and configured to illuminate at least a portion of the zone. In various embodiments, an exemplary data hub further comprises a power controller configured to couple to a power line that supplies power to the device, configured to provide electrical power to the annunciator, the sensor, and the processor, and further configured to change a frequency of power. In various embodiments, an exemplary data hub further comprises a power controller configured to provide electrical power to the annunciator, the sensor, the processor, and the data controller. In various embodiments, an exemplary data hub further comprises a power controller configured to provide electrical power to the annunciator, the sensor, the processor, and the light source. In various embodiments, an exemplary data hub further comprises a communication module in communication with the processor, wherein the communication module is configured to communicate with a network. In various embodiments, an exemplary data hub further comprises a power controller configured to provide electrical power to the annunciator, the sensor, the processor, and the communication module.

In various embodiments, the sensor is operable to communicate the signal to the processor wirelessly via Bluetooth, WiFi, radio, and/or consumer infrared protocols. In various embodiments, the communication module is operable to communicate with the network wirelessly via Bluetooth, WiFi, radio, and/or consumer infrared protocols. In various embodiments, the communication module is operable to communicate with the network via TCP/IP protocol. In various embodiments, the sensor unit housing comprises a boss extending therefrom and having a passage defined therethrough, the boss configured to fit within an aperture defined within the device so to attach the data hub to the device. In various embodiments, the boss is threaded, and wherein the data hub is attached to the device by threading a nut over the boss within the device. In various embodiments, the power supplied to the device is supplied by a power line, and whereby at least part of the power line extends into the passage of the boss and into the sensor unit housing.

In various embodiments, an exemplary data hub further comprises a power controller configured to provide power to the annunciator, the sensor, and the processor, the power controller configured to couple to the power line. In various embodiments, an exemplary data hub further comprises a power controller configured to provide power to the annunciator, the sensor, the processor, and to a light of the light source, the power controller configured to couple to the power line. In various embodiments, an exemplary data hub further comprises a housing lid configured to couple to the sensor unit housing, the housing lid comprising a boss extending therefrom and having a passage defined therethrough, the boss configured to fit within an aperture defined within the device so to attach the data hub to the device. In various embodiments, the boss is threaded, and wherein the data hub is attached to the device by threading a nut over the boss within the device. In various embodiments, the power supplied to the device is supplied by a power line, and whereby at least part of the power line extends into the passage of the boss and into the sensor unit housing. In various embodiments, an exemplary data hub further comprises a power controller configured to provide power to the annunciator, the sensor, and the processor, the power controller configured to couple to the power line. In various embodiments, an exemplary data hub further comprises a power controller configured to provide power to the annunciator, the sensor, the processor, and to a light of the light source, the power controller configured to couple to the power line.

In various embodiments, the sensor unit housing is configured to attach to the device such that the annunciator, the sensor, and the processor are located outside of the device. In various embodiments, the sensor unit housing is configured to attach to the device such that the annunciator, the sensor, and the processor are located inside of the device. In various embodiments, the device comprises a device housing and a cover reversibly attached to the device housing, wherein the device housing and the cover define a volume therein, wherein the sensor unit housing is at least partially within the volume. In various embodiments, the device comprises a device housing. In various embodiments, the device comprises a fixture. In various embodiments, the device comprises a light fixture. In various embodiments, the sensor comprises a camera. In various embodiments, the sensor is selected from the group consisting of an infrared sensor, an ultrasonic sensor, and a magnetic sensor. In various embodiments, the data controller uses learned intelligence to determine whether a space is occupied and operates upon the learned intelligence to actuate the annunciator. In various embodiments, the annunciator comprises a light source. In various embodiments, the annunciator comprises an audio source comprising a speaker. In various embodiments, the annunciator further comprises an audio source comprising a speaker.

In various embodiments, the communication module includes a receiver and is structured to receive data from the network and to communicate the data to the data controller, and the data controller is structured change the operation of a light source and/or the annunciator in response to the data.

In various embodiments, the data includes a broadcast, and the annunciator is structured to transmit the broadcast. In various embodiments, an exemplary data hub further comprises a discharge unit coupled thereto, the discharge unit configured to discharge a scent or fragrance from a source of scent or fragrance. In various embodiments, the discharge unit is configured to discharge the scent or fragrance when sensor senses the one or more pedestrians within the zone. In various embodiments, the device comprises at least a cover, and wherein the sensor unit housing is configured to couple to the cover. In various embodiments, the cover has a cover aperture defined therethrough, and wherein the sensor unit housing is configured to couple to the cover by way of a boss of the sensor unit housing being positioned within the cover aperture. In various embodiments, the sensor unit housing is configured to attach to the device outside of the device. In various embodiments, the sensor unit housing is configured to attach to the device inside of the device.

In various embodiments, an exemplary data hub further comprises the device. In various embodiments, the device comprises a light fixture, and wherein the sensor unit housing is configured to couple to the light fixture. In various embodiments, the device comprises a device housing, and wherein the sensor unit housing is configured to couple to the device housing. In various embodiments, the device comprises a light fixture having a cover, and wherein the sensor unit housing is configured to couple to the cover. In various embodiments, the device comprises a light fixture having a cover, and wherein the sensor unit housing is configured to couple to the cover. In various embodiments, the cover comprises a plurality of optical elements. In various embodiments, the cover includes a diffusion surface treatment.

In various embodiments, the light fixture comprises a flange, and wherein the cover couples to the light fixture at the flange. In various embodiments, an exemplary data hub further comprises a seal positioned between the sensor unit housing and the device. In various embodiments, the annunciator comprises a plurality of light emitting diodes. In various embodiments, the annunciator comprises a plurality of red-green-blue light emitting diodes. In various embodiments, the power controller is further configured to provide surge protection. In various embodiments, an exemplary data hub further comprises an audio source configured to emit an audio signal. In various embodiments, the audio source is configured to emit the audio signal upon detection of the one or more pedestrians by the sensor. In various embodiments, the audio source is configured to emit the audio signal upon detection of the one or more vehicles by the sensor. In various embodiments, the audio source is configured to emit the audio signal upon receipt of instructions from a handheld device in wireless communication with the data hub. In various embodiments, the audio source is configured to emit the audio signal upon receipt of instructions from a panic button in wired or wireless communication with the data hub. In various embodiments, an exemplary data hub is configured to communicate with one or more additional data hubs in wired or wireless communication with the data hub.

In various embodiments, an exemplary data hub forms a system, the system further comprising one or more additional data hubs. In various embodiments, an exemplary data hub forms a system, the system further comprising one or more additional data hubs, wherein the data hub and the one or more additional data hubs are in wireless communication with a cloud connector. In various embodiments, an exemplary data hub forms a system, the system further comprising one or more additional data hubs, wherein the data hub and the one or more additional data hubs are in wireless communication with a cloud computing service via a local Ethernet connection. In various embodiments, the sensor is configured to obtain license plate information from a license plate of at least one of the one or more vehicles. In various embodiments, the sensor is further configured to determine which parking space of the plurality of parking spaces within the zone one of the one or more vehicles is parked. In various embodiments, the processor is configured to transmit a location of the parking space of the plurality of parking spaces within the zone one of the one or more vehicles is parked to a handheld device in wireless communication with the system. In various embodiments, an exemplary data hub forms a system, the system further comprising a second data hub located at an entrance of a parking lot or garage and a third data hub location at an exit of the parking lot or garage, wherein a second sensor of the second data hub can identify a particular vehicle upon entry of the parking lot or garage, whereby the sensor can identify a parking space within the plurality of parking spaces where the particular vehicle parks, and whereby a third sensor of the third data hub can identify the particular vehicle upon exit of the parking lot or garage. In various embodiments, an exemplary data hub is further configured to calculate a parking fee based upon a date and time the particular vehicle entered the parking lot or garage and a date and time the particular vehicle exited the parking lot or garage.

In various embodiments, the sensor is configured to detect an ambient light level, and whereby the processor is configured to receive the detected ambient light level and direct the light source to fully illuminate, partially illuminate, or illuminate at a higher level than a then-current level of illumination. In various embodiments, the sensor is configured to detect an ambient light level, and whereby the processor is configured to receive the detected ambient light level and direct the light source to discontinue illumination, partially illuminate, or illuminate at a lower level than a then-current level of illumination. In various embodiments, the sensor is configured to detect an ambient light level, and whereby the processor is configured to receive the detected ambient light level and direct the light source to illuminate when the detected ambient light level is low and to discontinue illumination when the detected ambient light level is high. In various embodiments, the data hub further comprises a plug or port configured therein or extending therefrom, the plug or port configured to provide power to an electronic device from a power line that supplies the power to the device. In various embodiments, the data hub further comprises a plug or port configured therein or extending therefrom, the plug or port configured to provide the power to an electronic vehicle from the power controller that receives the power from the power line.

The present disclosure includes disclosure of a system, comprising a plurality of data hubs, each data hub comprising an annunciator configured to generate a first indication and a second indication; a sensor configured to detect a zone comprising a plurality of parking spaces in a vicinity of the data hub and to determine whether or not one or more vehicles and/or one or more pedestrians are present within the zone, the sensor further configured to emit one or more signals corresponding to said detection; a processor in communication with the annunciator and the sensor, the processor configured to receive the one or more signals from the sensor and operable to direct the annunciator to generate the first indication or the second indication in response to the signal; and a sensor unit housing having at least portions of the annunciator, the sensor, and the processor located therein, the sensor unit configured to attach to a device such that power supplied to the device is also used to supply power to the data hub.

In various embodiments, the system further comprises a cloud connector in wireless communication with the plurality of data hubs. In various embodiments, the system further comprises a cloud computing service in wired communication with the plurality of data hubs via a local Ethernet connection. In various embodiments, a first sensor of a first of the plurality of data hubs is configured to detect a vehicle of the plurality of vehicles at a first location, and wherein a second sensor of a second of the plurality of data hubs is configured to detect the vehicle at a second location different from the first location. In various embodiments, a first sensor of a first of the plurality of data hubs is configured to detect a vehicle of the plurality of vehicles in a parking space. In various embodiments, at least a first sensor in communication with the system is configured to detect the vehicle at an entrance to a parking lot or garage, and wherein at least a second sensor in communication with the system is configured to detect the vehicle at an exit of the parking lot or garage. In various embodiments, the first sensor is a sensor of one of the plurality of data hubs, and wherein the second sensor is a sensor of another of the plurality of data hubs. In various embodiments, an exemplary system is configured to detect a vehicle at an entrance to a parking lot or garage, configured to detect the vehicle within the parking lot or garage, configured to detect a location where the vehicle is parked within the parking lot or garage, and configured to detect the vehicle at an exit of the parking lot or garage. In various embodiments, an exemplary system is further configured to calculate a parking fee based upon a date and time the vehicle entered the parking lot or garage and a date and time the vehicle exited the parking lot or garage. In various embodiments, an exemplary system is further configured to transmit the location where the vehicle is parked within the parking lot or garage to a handheld device in wireless communication with the system.

The present disclosure includes disclosure of a method for monitoring a parking zone, comprising the steps of (such as executing on or using a processor, as referenced herein) operating a data hub, comprising an annunciator configured to generate a first indication and a second indication; a sensor configured to detect a zone comprising a plurality of parking spaces in a vicinity of the data hub and to determine whether or not one or more vehicles and/or one or more pedestrians are present within the zone, the sensor further configured to emit one or more signals corresponding to said detection; a processor in communication with the annunciator and the sensor, the processor configured to receive the one or more signals from the sensor and operable to direct the annunciator to generate the first indication or the second indication in response to the signal; and a sensor unit housing having at least portions of the annunciator, the sensor, and the processor located therein, the sensor unit configured to attach to a device such that power supplied to the device is also used to supply power to the data hub; detecting the zone using the sensor to determine whether or not one or more vehicles and/or one or more pedestrians are present within the zone; emitting one or more signals corresponding to said detection; and generating one of the first indication and the second indication using the annunciator based upon the emitted one or more signals, wherein the generation is facilitated by the processor. In various embodiments, the step of generating is performed to generate the first indication, the first indication indicative of the one or more signals corresponding to the detection of a vehicle in each parking space of the plurality of parking spaces. In various embodiments, the step of generating is performed to generate the second indication, the first indication indicative of the one or more signals corresponding to the detection of a lack of a vehicle in at least one parking space of the plurality of parking spaces.

BRIEF DESCRIPTION OF THE DRAWINGS

The described embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 4 shows a schematic of a parking commerce system according to exemplary embodiments of the present disclosure;

FIG. 24B shows a table of various LED output power settings in view of ambient light, motion timers, and output power settings, according to an exemplary embodiment of the present disclosure;

FIGS. 25-27A show electrical diagrams for a sensor unit according to exemplary embodiments of the present disclosure;

FIG. 28 shows a data hub having exemplary componentry coupled to a light fixture according to exemplary embodiments of the present disclosure;

FIG. 29 shows a data hub having exemplary componentry coupled to a fixture according to exemplary embodiments of the present disclosure;

FIG. 30 shows a side view of a housing according to exemplary embodiments of the present disclosure;

FIG. 31 shows another side view of a housing according to exemplary embodiments of the present disclosure;

FIG. 32 shows a side view of a housing lid according to exemplary embodiments of the present disclosure;

FIG. 33 shows a perspective view of at least part of a housing according to exemplary embodiments of the present disclosure;

FIG. 34 shows a detailed view of a portion of the perspective view of the housing shown in FIG. 33, according to exemplary embodiments of the present disclosure;

Figure 1:
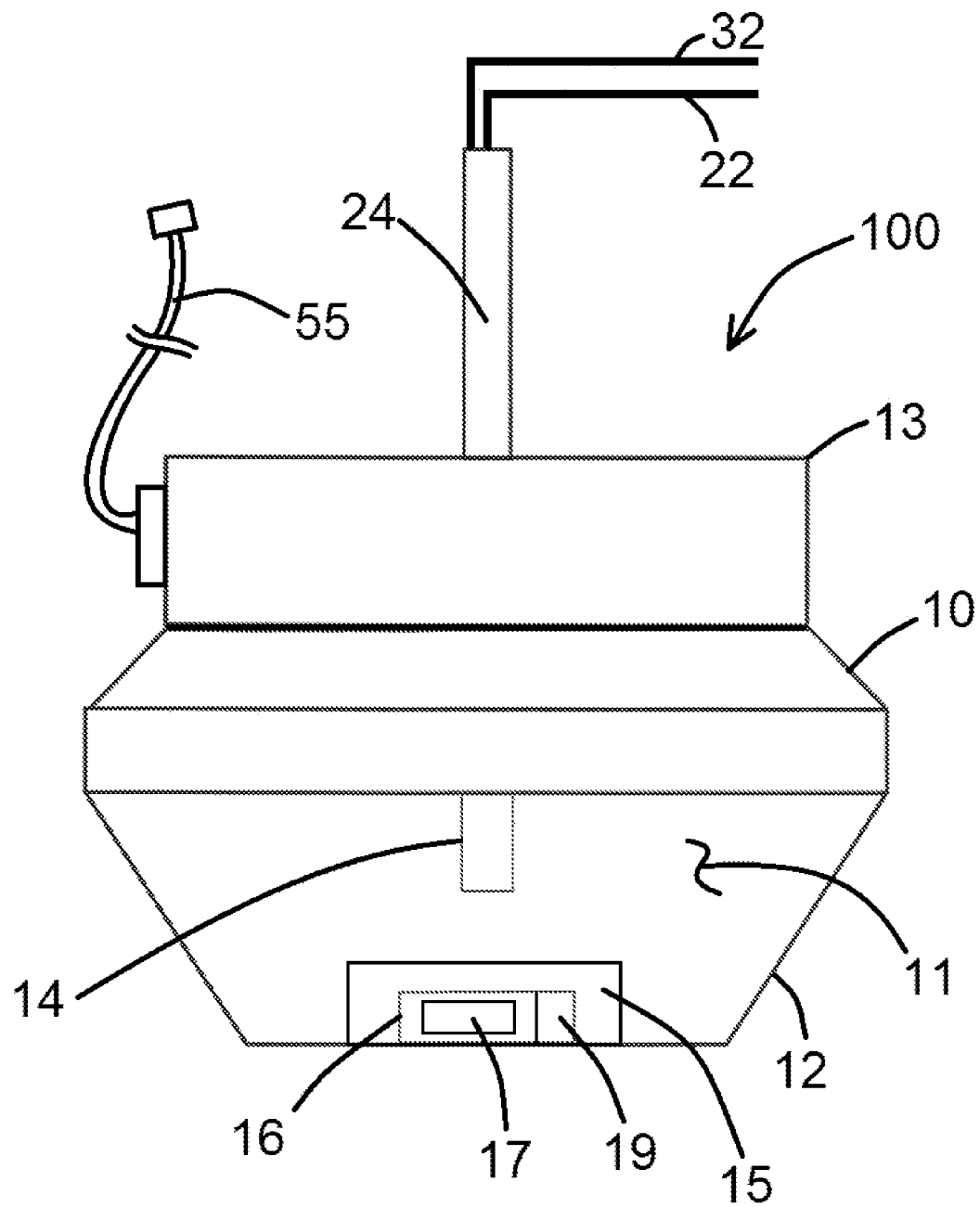
FIG. 1 shows a data hub according to exemplary embodiments of the present disclosure.

Like reference numerals indicate the same or similar parts throughout the several figures. An overview of the features, functions and configuration of the components depicted in the various figures will now be presented. It should be appreciated that not all of the features of the components of the figures are necessarily described. Some of these non-discussed features, such as various fasteners, etc., as well as discussed features are inherent from the figures. Other non-discussed features may be inherent in component geometry or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure includes disclosure of devices, systems and methods of a parking commerce system (PCS), including a lighting fixture data hub. The lighting fixture data hub of the present disclosure enables various aspects, features and functions of a PCS to be packaged within or attach to a lighting fixture specifically designed for such applications. Exemplary lighting fixture data hubs of the present disclosure enable efficient use of the existing infrastructure of a parking facility by eliminating redundant power and communication systems to reduce the initial cost and maintenance to implement the PCS. Exemplary lighting fixture data hubs of the present disclosure further enable consolidation and optimization of sensory and indication components, thereby further lowering the cost to implement the PCS. Further advantages of lighting fixture data hub and PCS embodiments are disclosed herein.

Many of the exemplary embodiments of the present disclosure are described with respect to parking facility applications, including the PCS. Exemplary devices, systems and methods disclosed herein may be employed in other applications, such as security and surveillance and energy management environments. Consequently, the embodiments described in the present disclosure are not limited to parking environments, parking facilities or PCS.

A data hub according to at least one embodiment of the present disclosure is shown in FIG. 1. As shown in FIG. 1, a data hub 100 may include a fixture 13 defining a volume 11, the fixture 13 including a cover 12 reversibly attached to a housing 10. The cover 12 includes side walls to define a lens compartment 15 within the fixture 13. The cover 12 may be reversibly attached to the housing 10 by any suitable means, including but not limited to screws and clips. The housing 10 includes side walls to define one or more housing compartments within the fixture 13. The housing 10 may further include one or more housing apertures 21, such as shown in FIG. 8C, to enable one or more connections to the data hub 100. For example, a power line 22 may pass through the housing 10 via such an aperture to provide electrical power to the data hub 100. The data hub 100 may be employed in any desired location within or outside the parking facility.

Figure 36:
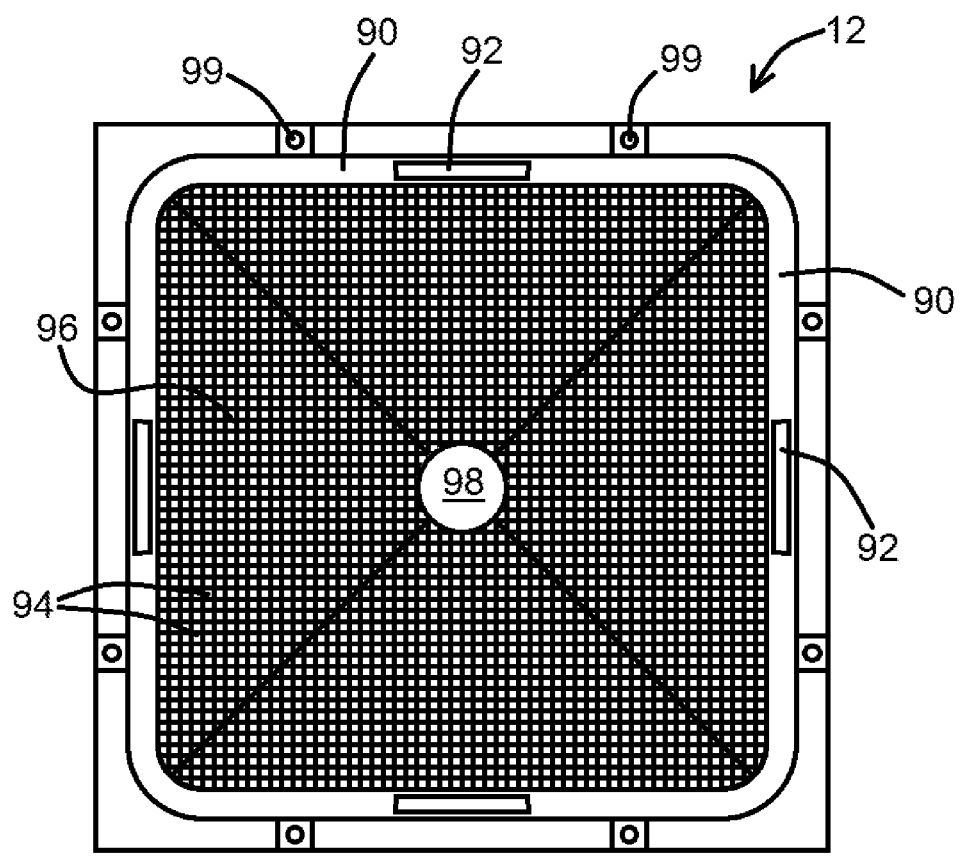
FIG. 36 shows a bottom view of a cover according to exemplary embodiments of the present disclosure.

The data hub 100 may further include a light source 14 disposed within the volume 11 of the fixture 13. The light source 14 is configured to emit a desired amount of visible light. The light source 14 may be any suitable means of providing a desired illumination of an area in the vicinity of the data hub 100 as described in further detail herein. The cover 12 may further include a plurality of optical elements 94, as shown in FIG. 36, formed therein that are configured to distribute light emitted from a light source 14 into a desired light distribution (i.e., pattern). Cover 12 may also include a diffusion surface treatment 96, such as frosted or stippling, configured to diffuse of the light emitted from the light source 14 into the area. To enable the desired light distribution, the cover 12 may be made of a substantially optically transparent or at least translucent material, including but not limited to glass, cyclic olefin copolymer (COC), polymethylmethacrolate (PMMA), polycarbonate (PC), PC/PMMA composite, silicones, fluorocarbon polymers, and polyetherimide (PEI), or other suitable material. Sidewalls 90 of cover 12, such as shown in FIG. 36, may have one or more sidewall apertures 92 defined therein, so that, for example, a sensor 18 can have a direct line of sight from within cover 12 to the outside of cover 12, as may be desired. Covers 12 of the present disclosure may also have one or more fastener apertures 99 defined therein so to receive a fastener (not shown) to fasten/couple cover 12 to one or more of a housing 10 or fixture 13, for example. A cover aperture 98, such as shown in FIG. 36, may be defined within cover 12 and be sized and/or shaped to receive a boss 124 of a sensor unit housing 122 and/or housing lid 180, as referenced herein, so to permit coupling of sensor unit housing 122 and/or housing lid 180 thereto.

Figure 35A:
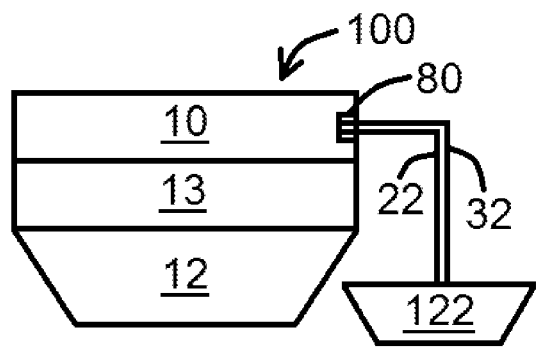
FIGS. 35A, 35B, 35C, 35D, and 35E show data hubs according to exemplary embodiments of the present disclosure.
Figure 35B:
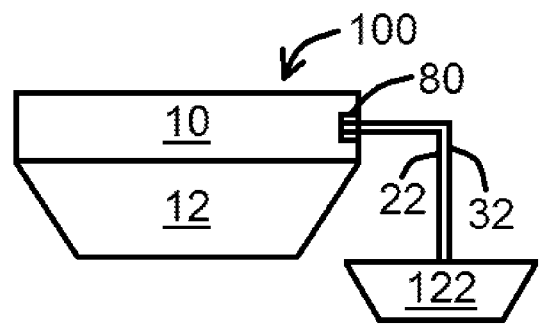
Figure 35C:
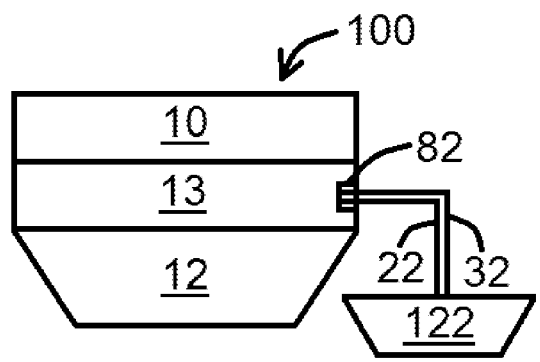
Figure 35D:
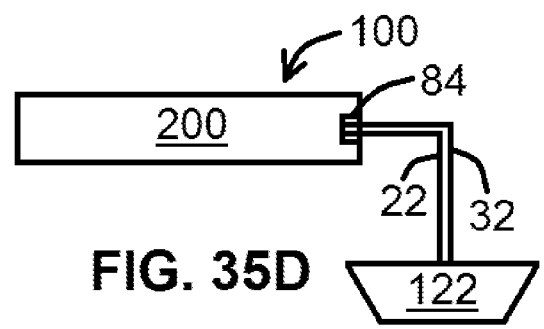
Figure 35E:
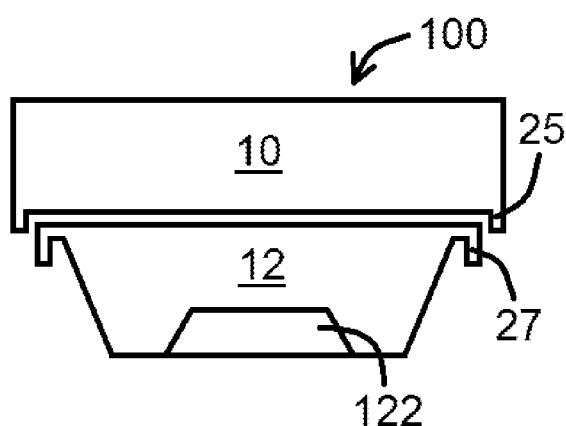
Figure 35F:
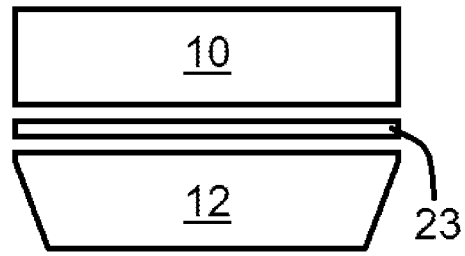
FIG. 35F shows a seal present between a housing and a cover according to exemplary embodiments of the present disclosure.

In addition to enabling the desired light distribution, the cover 12 further facilitates protecting the volume 11 of the fixture 13 and the components housed therein from intrusion of foreign material. A seal 23, such as shown in FIG. 35F, may be disposed between the cover 12 and the housing 10 (or between various components, such as housing 10, fixture 13, or light fixture 200 and cover 12 or sensor unit housing 122) such that, when assembled, the seal 23 prevents the intrusion of dirt, water, insects, or other foreign matter into the volume 11. The seal 23 may be made of any suitably resilient material capable of maintaining a seal between the cover 12 and the housing 10, preferably for the life of the data hub 100. In some embodiments, the cover 12 may engage a housing flange 25, such as shown in FIG. 35E, to facilitate attachment to the housing 10. Housing flange 25 may engage the housing 10 or be present upon housing 10 within a perimeter of the housing 10, thereby shielding the interface therebetween from direct exposure to the environment, thus minimizing potential intrusion into the data hub 100. Cover 12, in various embodiments, may have a cover flange 27, such as shown in FIG. 35E, around perimeter of cover 12, whereby cover flange 27 is configured to engage housing flange 25, as may be desired.

Figure 3:
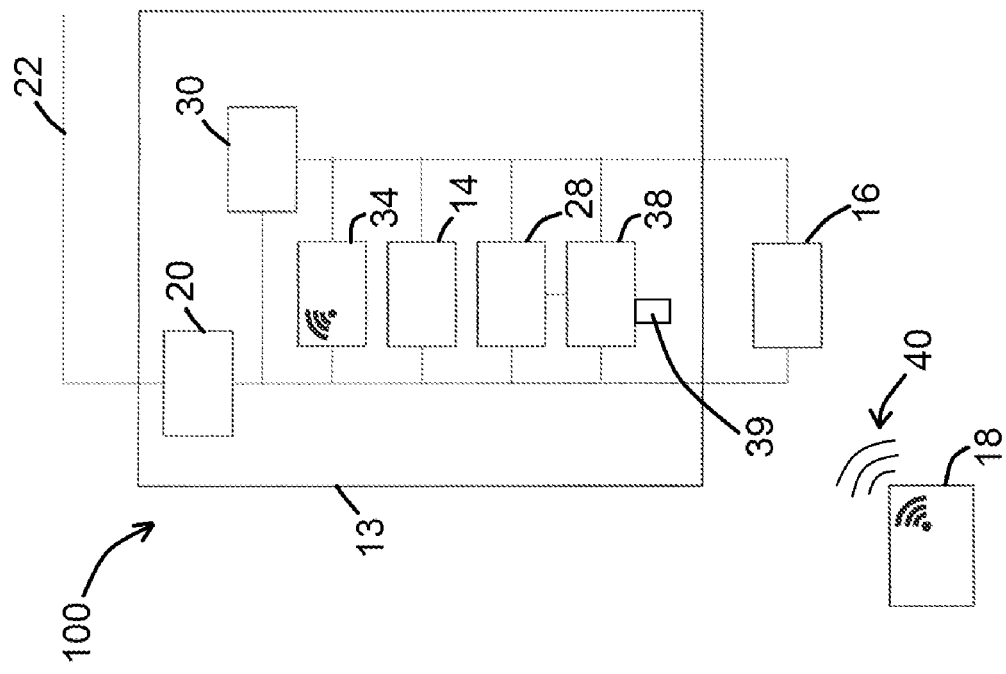
FIG. 3 shows a schematic of a data hub according to exemplary embodiments of the present disclosure.

The data hub 100 may further include/comprise an annunciator 16 disposed within the volume 11 of the fixture 13. The annunciator 16 is structured/configured to provide information to a guest using the parking facility, such as occupancy status of parking spaces within the vicinity of the data hub 100. In at least one form, the annunciator 16 may include/comprise a lighting device 17, such as one or more LEDs, configured to indicate the occupancy status of parking spaces nearby. The annunciator 16, and/or the data hub 100 in general, may further include/comprise an audio speaker 19 to broadcast auditory messages to guests. The annunciator 16 may be any suitable means of providing desired information in the vicinity of the data hub 100 as described further herein. In certain embodiments, the annunciator 16 may be connected to the housing 10 or cover 12 and be disposed at least partially within the volume 11, as shown in FIG. 1. Alternatively, the annunciator 16 may be disposed at least partially outside the volume 11, as shown in FIGS. 3 and 8, for example.

Figure 2:
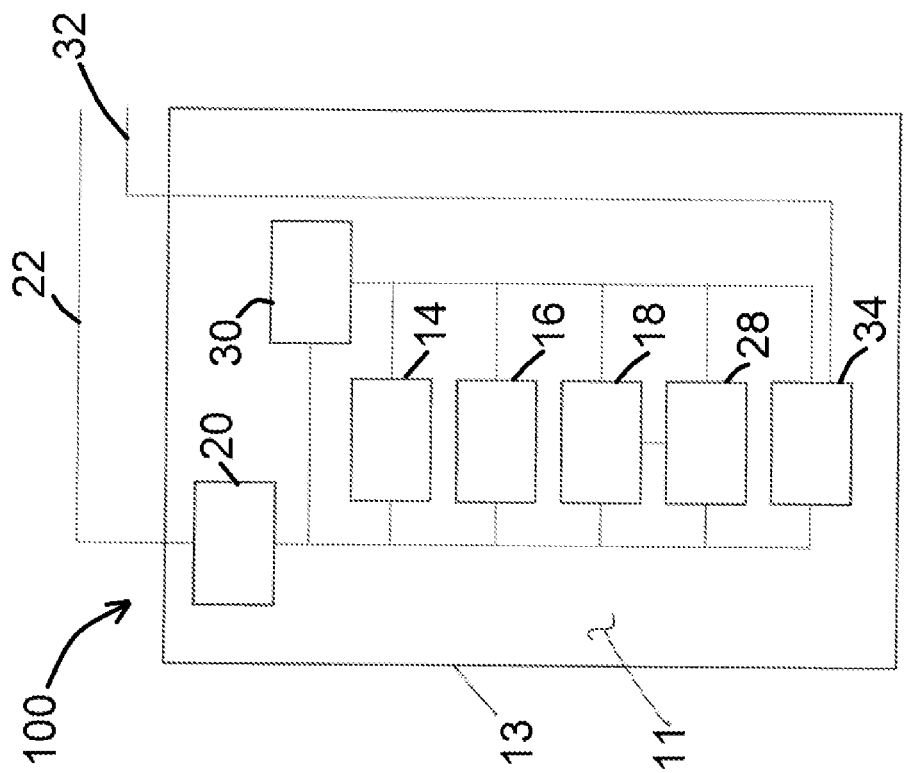
FIG. 2 shows a schematic of a data hub according to exemplary embodiments of the present disclosure.

FIG. 2 shows a schematic of an embodiment of the data hub 100. As shown in FIG. 2, the data hub 100 includes/comprises a power controller 20 electrically connected to an external power source via the power line 22, which may be part of the infrastructure of the parking facility. The power controller 20 can be disposed within the fixture 13 and may be further electrically connected to one or more of the light source 14, the annunciator 16, a processor 30, a data acquisition (DAQ) module 28 (also referred to herein as a data controller), and a communication module 34, and/or one or more components referenced herein. The power controller 20 is structured/configured to transform and regulate power provided to the data hub 100 via the power line 22 to provide stable power at desired operating voltages and currents to properly power the light source 14, annunciator 16, processor 30, DAQ module 28, communication module 34, and/or other components of the data hub 100 as described further herein. The power controller 20 may include/comprise electronic circuitry to enable various power regulation functions including, but not limited to, changing the frequency of the power from the standard main frequency of 50-60 Hertz (Hz) to some higher frequency, such as 20,000 Hz, stepping the voltage supplied to the light source 14 from startup to steady state operation, converting the power input via the power line 22 from high voltage alternating current to low voltage direct current, regulating power supplied to the light source 14 at a constant current, surge protection, and other regulatory functions. In at least one embodiment, the power controller 20 may step down the power input to supply direct current at a constant 5 Volts (V) or other applicable settings.

The power controller 20 is structured/configured to provide suitably regulated power to the annunciator 16, processor 30, sensor 18, DAQ module 28, communication module 34, and/or other components of the data hub 100.

The processor 30 may be operatively connected to the light source 14, annunciator 16, DAQ module 28, and/or communication module 34 to control the function(s) thereof. For example, and in certain embodiments, the processor 30 is configured to activate the light source 14 and/or annunciator 16. Alternatively, the processor 30 may be configured to activate the annunciator 16, and the light source 14 may be separately controlled.

In at least one embodiment, the data hub 100 may include/comprise a sensor 18 disposed within the fixture 13, as shown in FIG. 2. The sensor 18 may be electrically connected to the power controller 20 and be in operative communication with the processor 30. The sensor 18 may be structured/configured to sense a condition of one or more areas in the vicinity of the sensor 18 and to generate a corresponding sensor signal 40 (as shown in FIG. 3) indicating the condition. In at least one embodiment, the sensor 18 may be structured/configured to generate the sensor signal 40 indicative of whether an object, such as a vehicle or pedestrian, is in the vicinity of the sensor 18. The sensor 18 may be configured to generate the sensor signal 40 to indicate whether a vehicle is parked in one specific parking space. Alternatively, the sensor 18 may be configured to generate the sensor signal 40 to indicate whether any one of a number of parking spaces is occupied by a vehicle. The sensor 18 may be an optical sensor, such as a camera, radar or LiDAR, an infrared, acoustic, ultrasonic, harmonic, microwave or magnetic sensor, or any combination thereof. In certain embodiments, the data hub 100 may receive input from more than one sensor 18.

The sensor 18 may be operatively connected to the DAQ module 28 such that the sensor signal 40 is provided to the DAQ module 28, which is configured to interrogate the sensor signal 40 and communicate the interrogated signal 40 to the processor 30 for analysis. Signals 40 can also be directly transmitted from sensor 18 to processor 30. The processor 30 may analyze and operate upon the interrogated signal 40 to execute various functions. In at least one embodiment, the processor 30 may operate upon the interrogated signal 40 to determine whether one or more vehicles are parked in one or more parking spaces in the vicinity of the sensor 18, for example. Further, the processor 30 may operate upon the interrogated signal 40 to determine whether the sensor signal 40 was transient and indicative of a vehicle or pedestrian in motion. In certain embodiments, the DAQ module 28 may be a module within the processor 30.

In at least one embodiment of the data hub 100, the sensor 18 may be located outside of the fixture 13, as shown schematically in FIG. 3, while the power controller 20, processor 30, communication module 34, light source 14 and DAQ module 28 may be disposed within the fixture 13. In such an embodiment, the data hub 100 may include/comprise a receiver 38 structured/configured to receive the sensor signal 40 from the sensor 18, which may include/comprise a transmitter to communicate the sensor signal 40 to the receiver 38. In various embodiments, the receiver 38 is operatively connected to and communicates the sensor signal 40 to the DAQ module 28. In certain embodiments, the receiver 38 may be incorporated into the processor 30 or the communication module 34. In further embodiments, the receiver 38 may include/comprise an antenna 39, as shown in FIG. 3, to facilitate receipt of various signals. In various embodiments, the sensor 18 may transmit the sensor signal 40 via any capable wireless communication protocol including, but not limited to, 802.11 series WiFi, Bluetooth®, ZigBee® and other radio frequency means.

In at least one embodiment, the processor 30 may operate upon the sensor signal 40 to activate the annunciator 16. In one form, the annunciator 16 may be a lighting device including multiple light sources, each capable of generating a single or narrow color (i.e., wavelength) band of light. In such an embodiment, the processor 30 may activate one light source to indicate that a parking space is occupied, for example a red light. The processor 30 may activate another light source to indicate that a parking space is unoccupied, for example a green light. In one form, the processor 30 may flash one or more light sources on and off as a further indication, for example flashing a green light to indicate an unoccupied space. The annunciator 16 may include/comprise additional light sources, which when lit individually or in combination with one another, are indicative of various conditions in the vicinity of the data hub 100. For example, the annunciator 16 may include/comprise a blue light source to indicate whether one or more parking spaces in the vicinity of the data hub 100 is designated as a handicapped parking space or has some other use restriction.

In at least one embodiment, the annunciator 16 may be a lighting device including a light source capable of generated different colors of light. For example, the annunciator 16 may include/comprise a red-green-blue light-emitting diode, commonly referred to as an RGB LED. An RGB LED has multiple diodes, such as one red, one green and one blue, which enable the RGB LED to generate a broad range of colors. In such an embodiment, the processor 30 may be configured to activate the annunciator 16 and control the specific color or colors emitted by the annunciator 16 to indicate a condition of one or more parking spaces in the vicinity of the sensor 18 or data hub 100. Further, in such an embodiment, the annunciator 16 may communicate by indication additional or alternative information. For example, the annunciator 16 may emit a color light specific to the level or area within a parking facility where the data hub 100 is located. In many cases, the parking facility will designate a different color for each level or area of parking spaces within the parking structure, such as purple, orange, yellow, red, green, blue, etc. According to the present disclosure, the annunciator 16 may emit the color of light designated by the parking facility corresponding to the level or area in which the data hub 100 is located.

Figure 7:
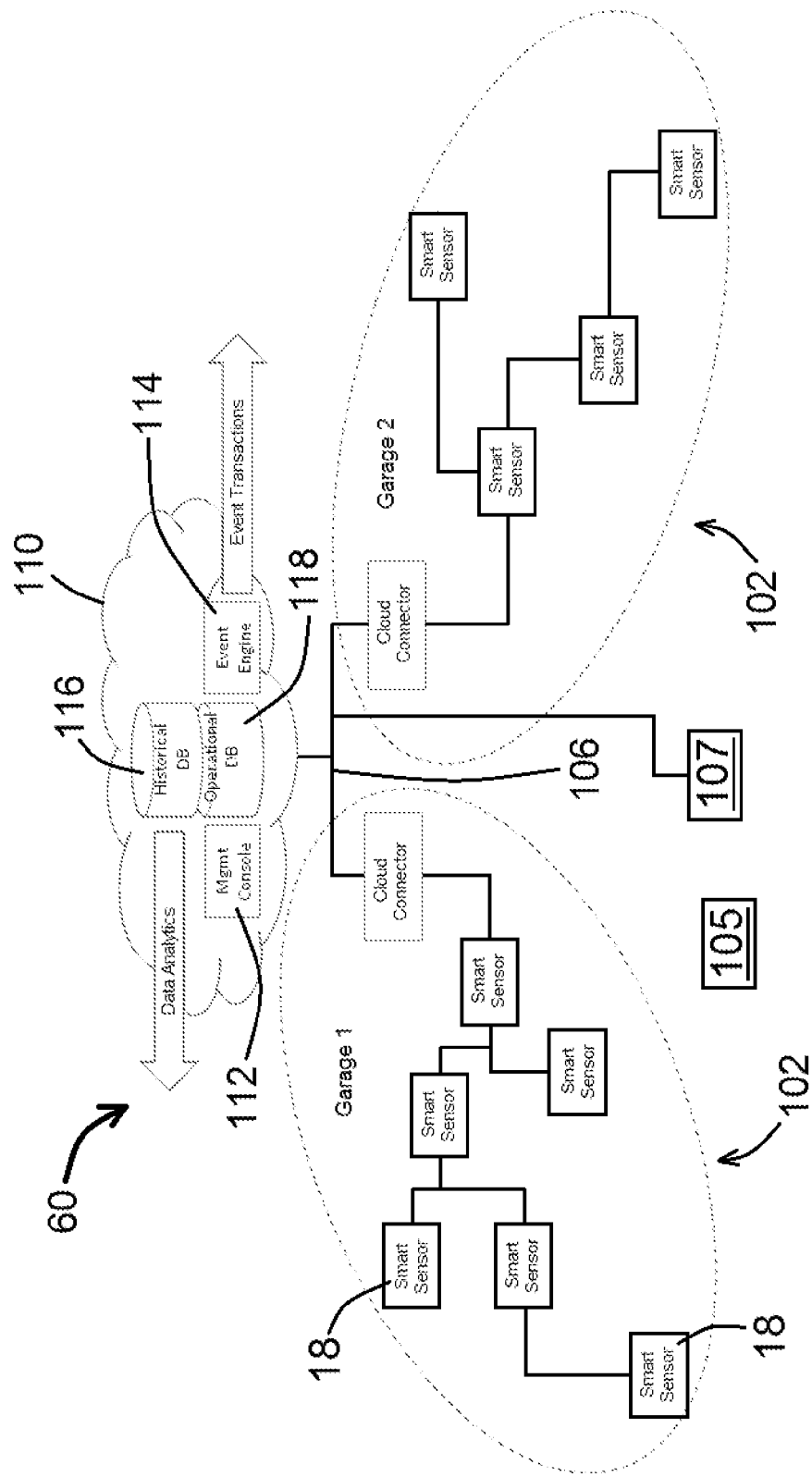
FIG. 7 shows a schematic of a parking commerce system according to exemplary embodiments of the present disclosure.

In at least one embodiment, the data hub 100 may include/comprise an emergency alert function. In such an embodiment, the sensor 18 may be configured to generate a distress signal when activated by a guest within the parking facility to initiate an emergency response and to communicate the location of the data hub 100. The processor 30 via the DAQ module 28 may interrogate the distress signal has described herein with respect to the sensor signal 40 and may operate upon the distress signal to initiate the emergency response. In such an embodiment, the sensor 18 may be/comprise a manual fire alarm switch, an automatic carbon monoxide detector, smoke detector, and/or fire detector, a "panic button" or like device that communicates with the DAQ module 28 either wired or wirelessly. In certain wireless embodiments, the sensor 18 may be an application (i.e., an application or "app") run on a smart device such as a smartphone, a tablet, a personal digital assistant, a laptop, etc. (such as a smart device 105 in communication with data hub 100, such as shown in FIG. 7) that allows the guest to activate the distress signal and summons assistance when within sufficient proximity of the data hub 100. In at least one embodiment, the data hub 100 may broadcast a banner to the smart device of the guest upon entering the parking facility. The banner prompts the guest to wirelessly connect to the data hub 100 and, upon the guest doing so, launches a virtual panic button on the smart device 105. In certain embodiments, the emergency alert sensor 18 may be separate from the data hub 100 but in communication with the data hub 100 by any suitable means. In at least one embodiment, and as shown in FIG. 7, a button 107 may be in wired (as shown) or wireless communication with other aspects of data hub 100, such that depressing button 107 (or depressing virtual button of smart device 105) causes one or more of the following: a) an audio signal to be emitted from audio speaker 19, such as an alarm, a notification that the police or other authorities have been contacted, and/or a notification that a representative of the parking location has been contacted, b) causes light sources 14 to illuminate and/or illuminate from less than 100% to 100%, and/or c) causes sensors 18 (such as cameras) to record video and optionally audio at or near a location of button 107 and/or smart device 105.

In certain embodiments, the annunciator 16 may include/comprise an audio device structured/configured to communicate an auditory message, for example, to a guest who has presently parked a vehicle in the vicinity of the data hub 100. The auditory message may include, but not limited to, music, current location (e.g., level or area), directions, advertising, greetings, guest information, weather warnings or alerts, emergency alerts and directions (e.g., fire, medical, assault, etc.), and Amber or Silver alerts. In such an embodiment, the sensor 18 may be structured/configured to detect the presence of a pedestrian passer-by, generate the sensor signal to indicate the presence and communicate the sensor signal 40 to the processor 30, which may distinguish between the pedestrian passerby and a passing vehicle and, as appropriate, cause the annunciator 16 to broadcast a greeting and other information to the passer-by. By further example, the annunciator 16 may communicate a message of appreciation to a departing guest.

The data hub 100 may include/comprise more than one annunciator 16 and may include/comprise more than one type of annunciator 16. In one form, the data hub 100 includes/comprises one auditory annunciator 16 and one lighting annunciator 16. In an alternative form, the annunciator 16 includes/comprises one lighting device to indicate parking space occupancy and a separate lighting device to indicate the current location with the parking facility. In certain embodiments, the annunciator 16 may comprise multiple lighting devices and multiple auditory devices, each dedicated to a specified condition. In such an embodiment, each annunciator 16 may be controlled by the processor 30. In alternative embodiments, certain annunciators 16 may be controlled by the processor 30 while the remaining annunciators 16 may be controlled by a device external to the data hub 100.

In at least one embodiment, the annunciator 16 and sensor 18 may be at least partially disposed within the volume 11 of the data hub 100, as shown in FIG. 2. In such embodiments, the annunciator 16 and sensor 18 may be positioned adjacent or within the volume 11 as to enable the functionality described herein. In one form, the sensor 18 may be positioned adjacent or within the cover 12 as to enable the sensor 18 to sense the condition (e.g., parking space occupancy). The annunciator 16 may be positioned adjacent or within the cover 12 as to enable the annunciator 16 to be seen or heard within the vicinity of the data hub 100.

As shown in FIG. 3, the annunciator 16 and/or sensor 18 may be physically connected to the processor 30. In certain embodiments, the annunciator 16 and/or sensor 18 may be hardwired to the processor 30. Alternatively, the annunciator 16 and/or sensor 18 may be connected to the processor 30 via a port in the data hub 100 by a reversible connection, such as a plug, coupling, jack, quick-connect, or other suitable means.

The data hub 100 may be mounted in a desired location by attaching the housing 10 to a ceiling, wall, or other desired surface of a structure by any suitable means, such as screws or bolts. The data hub 100 may be attached to the structure by a hanger 24, as shown in FIG. 1, where the hanger 24 is attached to the housing 10 at one end and to the structure at the opposite end. In certain embodiments, the hanger 24 may be/comprise a tube having attachment flanges at opposing ends through which the power line 22 may pass. In embodiments such as shown in FIG. 3, the data hub 100 may be mounted in the vicinity of one or more sensors 18. Power to the data hub 100 may be controlled external to the data hub 100, for example manually via a wall or panel switch, a remote sensor that controls individual data hubs 100, or a centrally-located sensor that controls a bank of data hubs 100.

As shown in FIGS. 1 and 2, the communication module 34 may be connected to the processor 30. In certain embodiments, the communication module 34 may be incorporated within the processor 30. The module 34 may be further connected to a network external to the data hub 100 via a communication line 32. The communication module 34 may communicate data generated by the data hub 100 to the network. For example, the communication module 34 may communicate the occupancy status in the vicinity of the data hub 100, as determined by the processor 30 based on the sensor signal 40 form the sensor 18. As a further example, the communication module 34 may communicate the presence of pedestrian guests in the vicinity of the data hub 100. As shown in FIG. 3, the communication module 34 may communicate data generated by the data hub 100 to the network via a wireless connection. In such an embodiment, the communication module 34 may generate and transmit a communication signal 35.

The communication module 34 may be configured with an open communications protocol to enable the data hub 100 to communicate with networks and servers operating under different protocols, either wired, as shown in FIGS. 1 and 2, or wirelessly, as shown in FIG. 3. Such protocols enable authentication, error detection and correction, and signaling and can also describe the syntax, semantics, and synchronization of analog and digital communications. Such protocols may be implemented in hardware and/or software and may include definitions of packet size, transmission speed, error correction types, handshaking and synchronization techniques, address mapping, acknowledgement processes, flow control, packet sequence controls, routing and address formatting.

FIG. 4 illustrates a system 60, such as a parking commerce system (PCS) 60, according to at least one embodiment of the present disclosure. The PCS 60 may include/comprise a plurality of data hubs 100 operably connected to a network 62 via one or more communication lines 32. Alternatively, the data hubs 100 may be operably connected to a network 62 via wireless communication as described further herein. The network 62 may include/comprise various components, such as sensors, indicators, devices, toll gates, payment subsystems and other PCS subsystems, including the sensors 18 in such embodiments as shown in FIG. 3. The network 62 may be connected to a server 64, which is structured/configured to control and manage operation of the network 62 including, at least partially, the data hubs 100. Server 64, as shown in FIG. 4, can comprise several hardware and software components, such as a storage medium 65 (a memory, such as RAM, ROM, a hard drive, a solid-state drive, etc.) configured to store signal 40 data from one or more sensors 18 of one or more data hubs. The server 64 may include/comprise various modules configured to facilitate the control and management of the PCS 60. By way of non-limiting example, the server 64 may include/comprise an administrative module 66 configured to facilitate overall control and management of the PCS 60 by generating commands to be executed by the server 64. The server 64 may include/comprise a monitoring module 67 configured to monitor the sensors and subsystems of the PCS 60 and provide data to the administrative module 66. The server 64 may further include/comprise an alert module 68 configured to provide an interface to external resources in the event of an emergencies and to generate appropriate alerts that may be communicated via the annunciators 16 of the data hubs 100 in such situations, for example, fire, weather, and other emergency alerts.

The communication module 34 may enable communication with the network 62 via the communication line 32 using file transfer protocol (FTP), transmission control protocol and the internet protocol (in combination, TCP/IP), user datagram protocol (UDP), hypertext transfer protocol (HTTP), post office protocol (POP3), internet message access protocol (IMAP), simple mail transfer protocol (SMTP), or other suitable protocols compatible with the specific PCS 60 to which the data hub 100 is connected. In certain embodiments, the communication module 34 may enable communication with the network 62 via a wireless connection including, but not limited to, 802.11 series WiFi, Bluetooth® and other radio frequency means.

Figure 5:
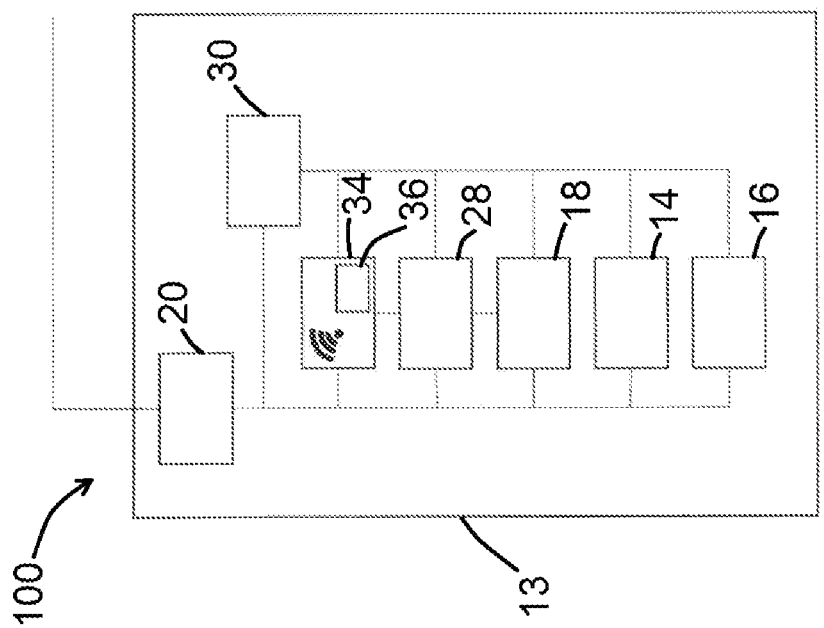
FIG. 5 shows a schematic of a data hub according to exemplary embodiments of the present disclosure according.

In at least one embodiment of the present disclosure as shown in FIG. 5, the data hub 100 may include/comprise a transceiver 36 in communication with the communication module 34. The transceiver 36 is structured/configured to both transmit and receive data between the communication module 34 and the network 62. The transceiver 36 may be structured/configured to enable wireless communication between the communication module 34, between multiple data hubs 100, and between the data hub 100 and the network 62 (not shown in FIG. 5). The transceiver 36 may include/comprise an antenna external or internal to the fixture 13 to facilitate wireless communication as referenced herein.

Figure 6:
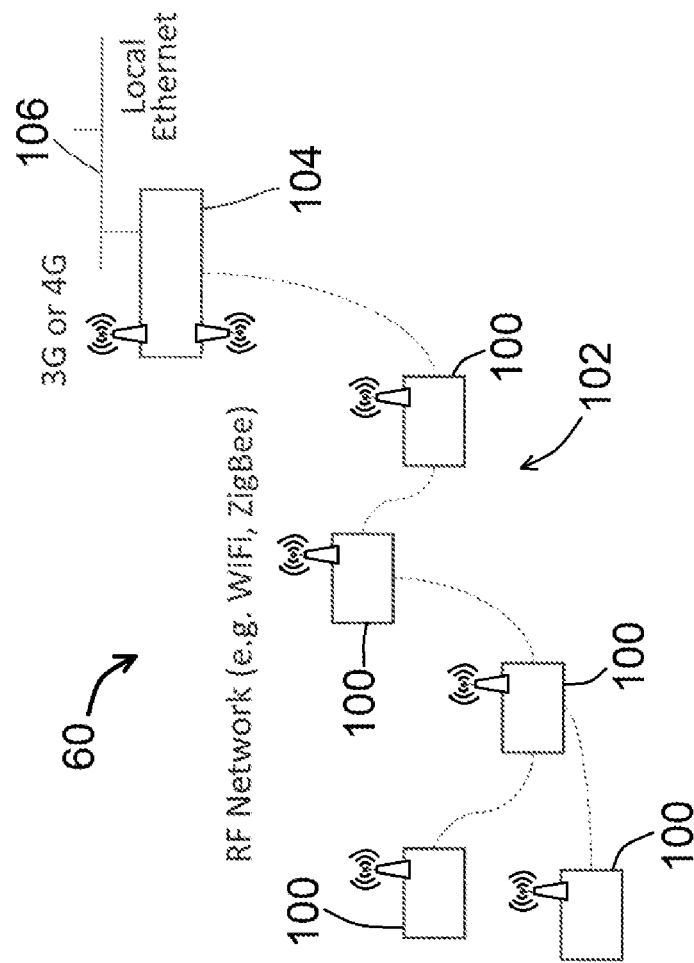
FIG. 6 shows a data hub network according to exemplary embodiments of the present disclosure.

The communication module 34 and transceiver 36, in various embodiments, enable multiple data hubs 100 to be wirelessly connected to each other to form a data hub mesh network 102, as shown in FIG. 6. The data hub mesh network 102 may include/comprise any desired number of data hubs 100 connected by wired and/or wireless communication. In embodiments where the data hubs 100 of the data hub mesh network 102 are connected wirelessly, the data hubs 100 may communicate within the network via any capable wireless communication protocol including, but not limited to, 802.11 series WiFi, Bluetooth, ZigBee and other radio frequency means. The data hub mesh network 102 may further include/comprise a cloud connector 104 (which may utilize 3G, 4G, or other configurations) to enable the data hub mesh network 102 to connect, interact and integrate with cloud computing services via a local Ethernet 106 connection, for example.

FIG. 7 illustrates a parking commerce system (PCS) 60 according to at least one embodiment of the present disclosure. The PCS 60 may include/comprise one or more data hub mesh networks 102 connected to a cloud computing service 110 via a local Ethernet 106 connection. The cloud computing service 110 may include/comprise one or more modules structured/configured to functionally execute the operations of the cloud computing service 110. In certain embodiments, the cloud computing service 110 includes/comprises management console 112, an event engine 114, a historical database 116 and an operational database 118. The description herein including modules emphasizes the structural independence of the aspects of the cloud computing service 110, and illustrates one grouping of operations and responsibilities of the cloud computing service 110. Other groupings that execute similar overall operations are understood within the scope of the present disclosure. Modules may be implemented in hardware and/or by a computer executing instructions stored in non-transient memory on one or more computer readable media, and modules may be distributed across various hardware or computer based components. The cloud computing service 110 may provide data analytics of the information collected and communicated by the data hubs 100. The cloud computing service 110 may further provide event transaction information collected and communicated by the data hubs 100, such as occupancy rates, revenues and other data.

In general, and regarding FIG. 7, data hubs 100, including "smart" sensors 18, potentially using license plate recognition (LPR, referenced in further detail herein), status signage and graphics (referenced herein as one or more of parking space identifiers 145, vehicle identifiers 147, and/or pedestrian identifiers), and cloud connectors (various hardware referenced herein used to transmit and/or receive signal 40 and related data) can be deployed in various parking environment. Data hubs 100 communicate with each other and cloud elements (which may include, but are not limited to, one or more of a data hub mesh network 102, a cloud connector 104, a cloud computing service 110, a management console 112, an event engine 114, a historical database 116, and/or an operational database 118, for example.

Figures 28, 29:
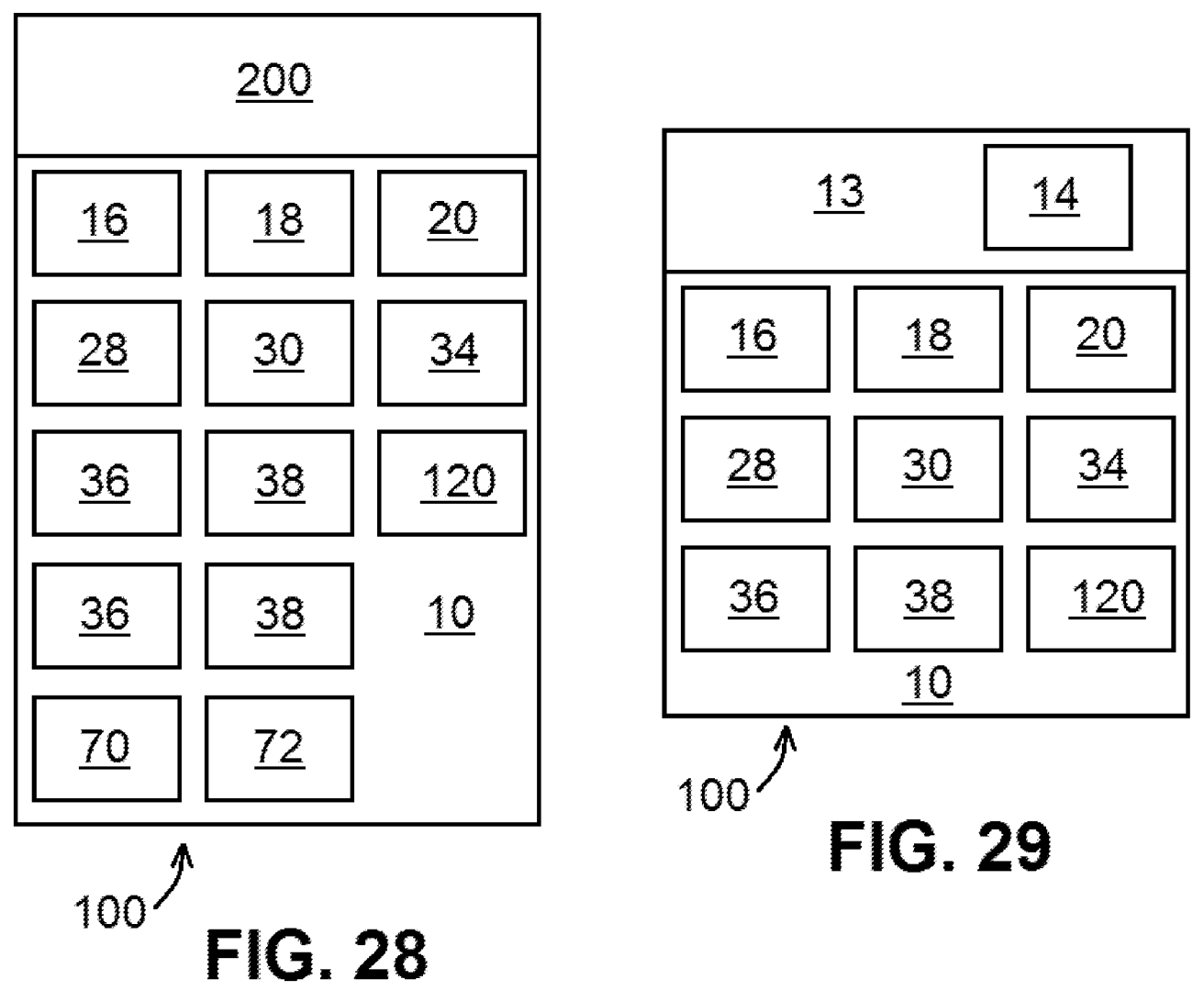

Smart sensors 18 of data hubs 100 can integrated into each light of a parking environment, such as an existing light 200 referenced in FIG. 28, or as part of a housing 10 and/or fixture 13 of the present disclosure having a light source 14. Said smart sensors 18 can work independently or collectively with other networked smart sensors 18 to assess their environment. These assessments include, but are not limited to parking spot availability, pedestrian motion, vehicle motion, license plate numbers associated with parking spots, etc. as referenced in detail herein.

Regarding FIG. 7, for example, cloud connectors 104 can provide a network gateway for sensors 18 to communicate securely with cloud services. DAQ modules 28 and/or processors 30 can receive signals 40 from sensors 18, and depending on the type of signal 40, said signals 40 can be routed to one or both of a historical database 116 and/or an event engine 114. A historical database 116 can be a data warehouse and multidimensional model that stores and aggregates data about the parking environments. This data can be made available via analytics dashboards and ad hoc analysis. Event engines react to configurable event conditions with configurable actions, allowing for the sharing specific of data and events with parking management partners, for example. Management consoles 112 can provide the ability to monitor and update deployed smart sensors 18 and related network infrastructure.

Figure 8A:
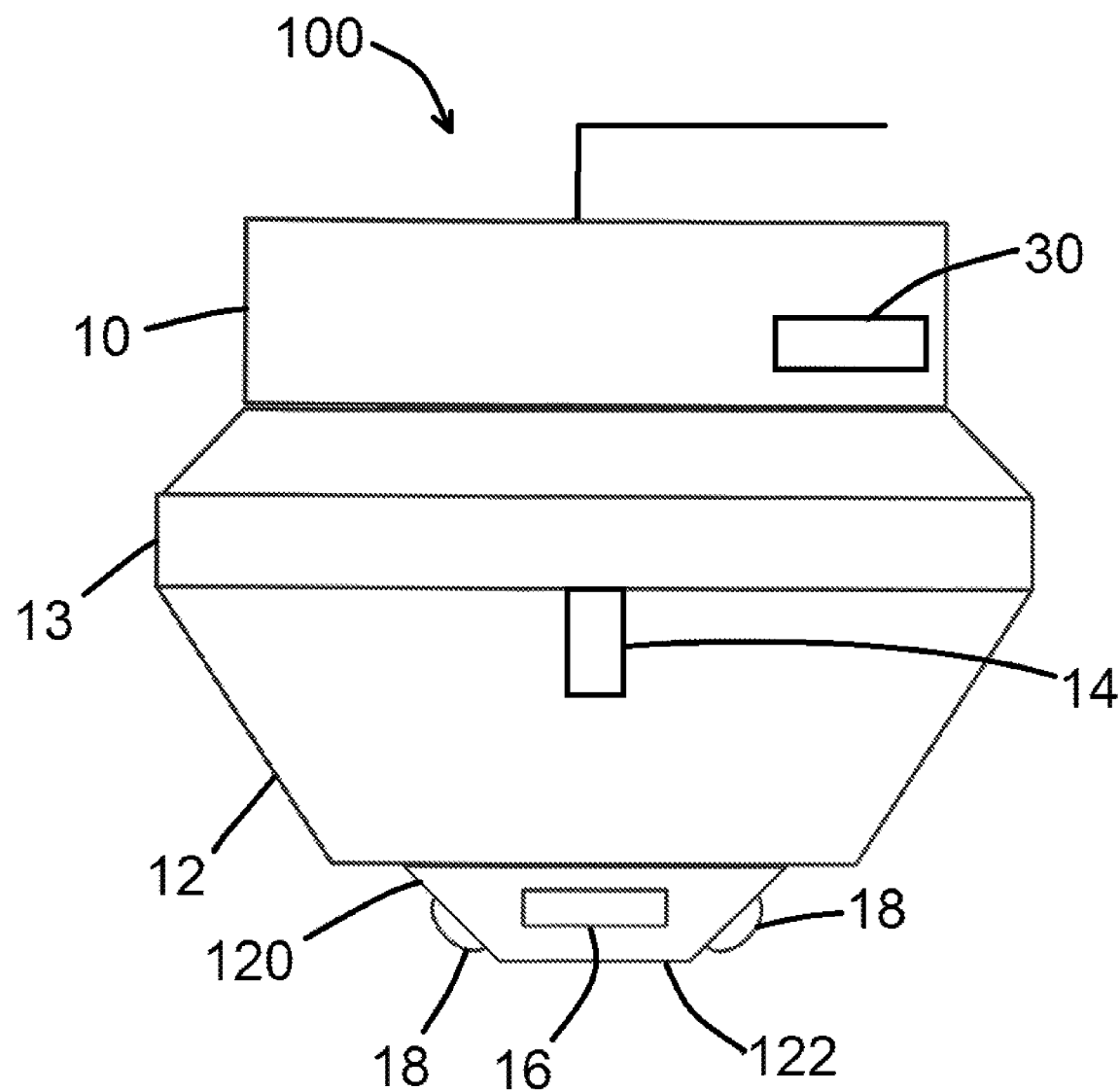
FIGS. 8A, 8B, 8C, 8D, 8E, 8F, and 8G show data hubs according to exemplary embodiments of the present disclosure.

As further shown in FIG. 8A, the annunciator 16 and/or sensor 18 may be attached to the cover 12 housing 10 to enable proximity information to be collected by the sensor 18 and lighting or auditory information to be emitted or broadcast from the annunciator 16. In at least one embodiment according to the present disclosure, the data hub 100 may include/comprise a sensor unit 120. As shown in FIG. 8A, the sensor unit 120 may be attached to the cover 12 of the fixture 13. In alternative embodiments, the sensor unit 120 may be attached to the housing 10 of the fixture 13. Alternatively, the sensor unit 120 may be disposed within the fixture 13. The sensor unit 120 may be include/comprise the sensor 18 and the annunciator 16 packaged together within a sensor unit housing 122. The sensor unit 120 may include/comprise more than one sensor 18.

Figure 8B:
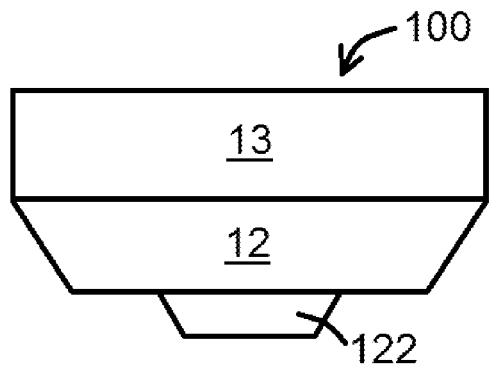
Figure 8C:
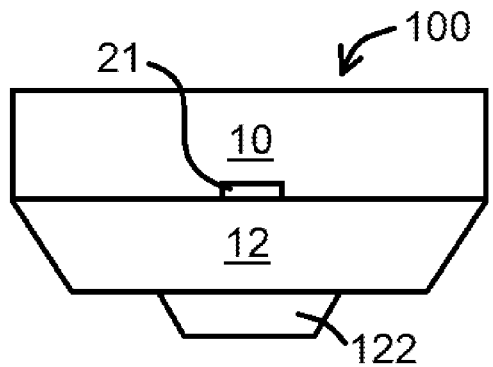
Figure 8D:
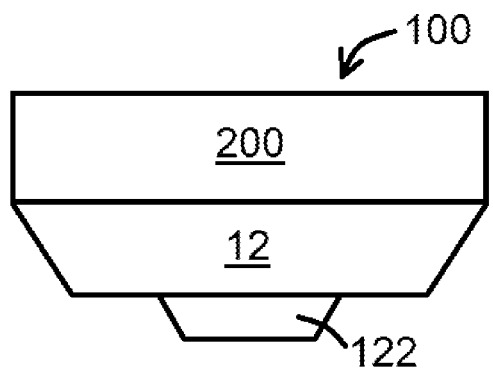
Figure 8E:
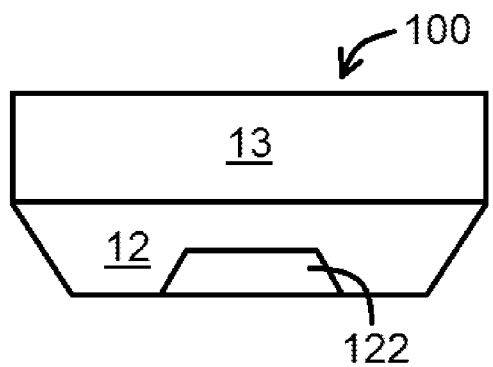
Figure 8F:
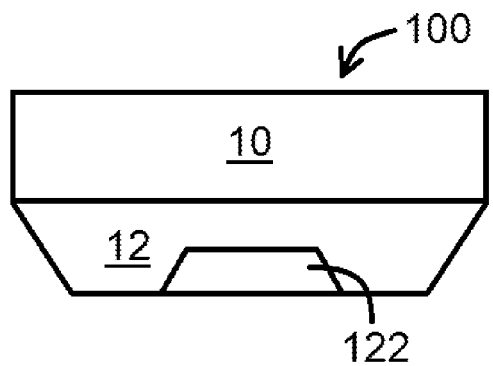
Figure 8G:
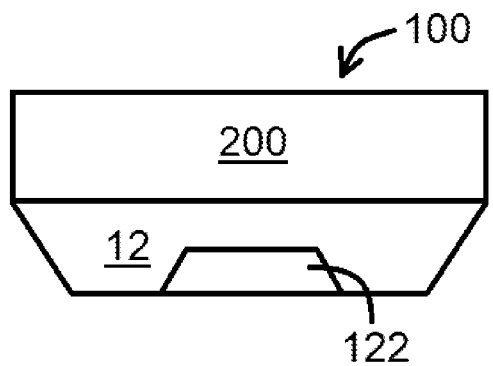

FIGS. 8B-8G show additional embodiments of data hubs 100 of the present disclosure. FIGS. 8B, 8C, and 8D show exemplary data hubs 100 of the present disclosure whereby sensor housing units 122 are coupled to and positioned outside of covers 12, whereby covers 12 are coupled to a fixture 13 (FIG. 8B), housing 10 (FIG. 8C), or light fixture 200 (FIG. 8D). FIGS. 8E, 8F, and 8G show exemplary data hubs 100 of the present disclosure whereby sensor housing units 122 are coupled to and positioned inside of covers 12, whereby covers 12 are coupled to a fixture 13 (FIG. 8E), housing 10 (FIG. 8F), or light fixture 200 (FIG. 8G). It is expressly noted that various data hubs 100 of the present disclosure may have components, features, and/or configurations shown and described with respect to one or more embodiments, and said components, features, and/or configurations can also apply to other embodiments as may be desired (see FIGS. 28 and 29, for example, and additional disclosure herein).

Figure 9:
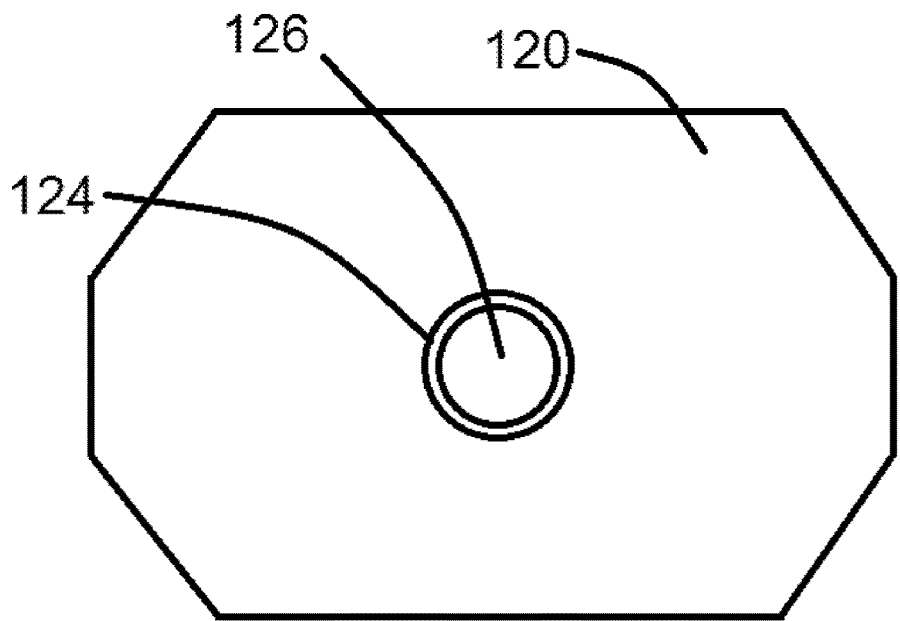
FIG. 9 shows a top view of a sensor unit according to exemplary embodiments of the present disclosure.
Figure 10:
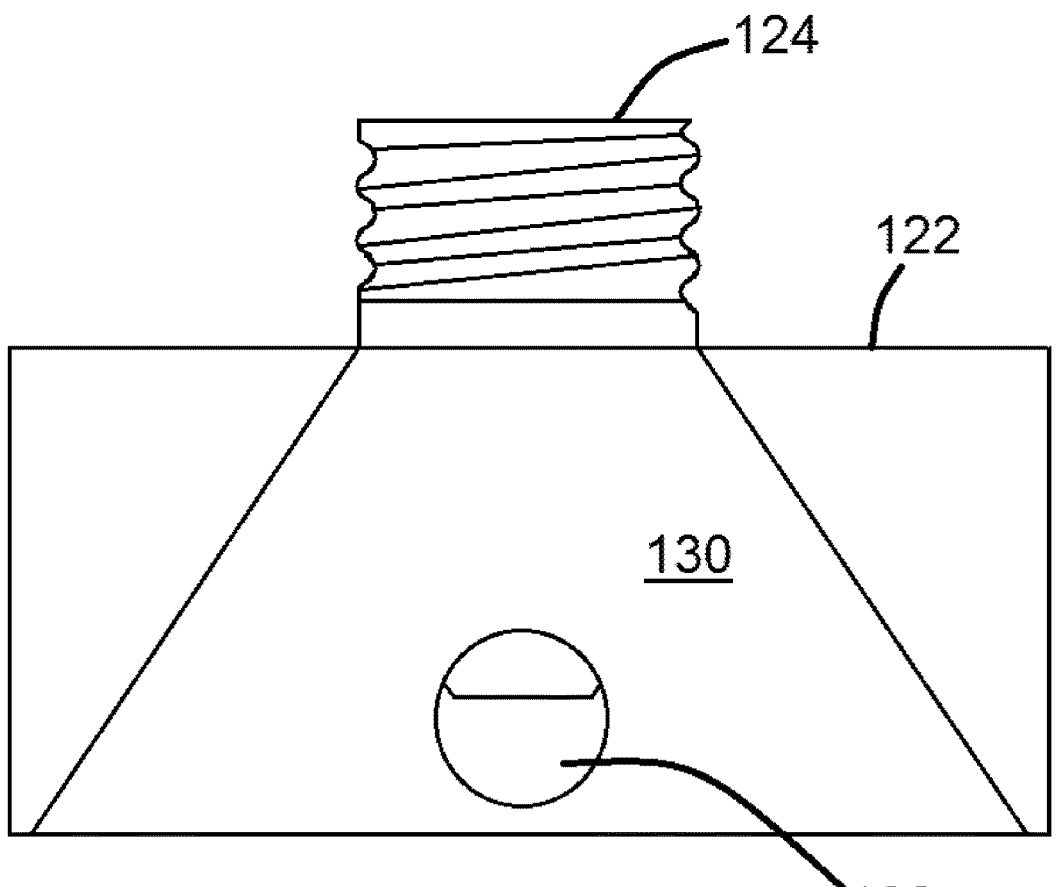
FIG. 10 shows a side view of a sensor unit according to exemplary embodiments of the present disclosure.
Figure 12:
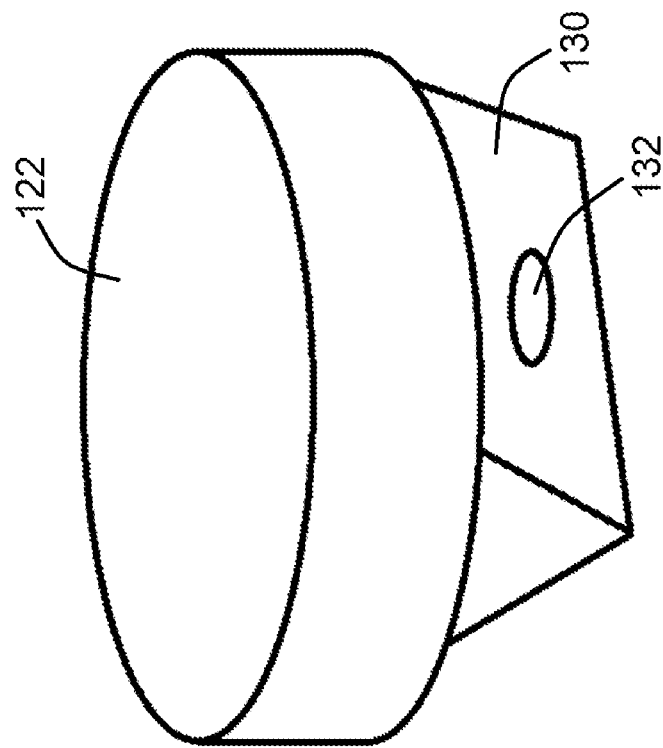
FIG. 12 shows an isometric view of an alternative sensor unit according to exemplary embodiments of the present disclosure.
Figure 11:
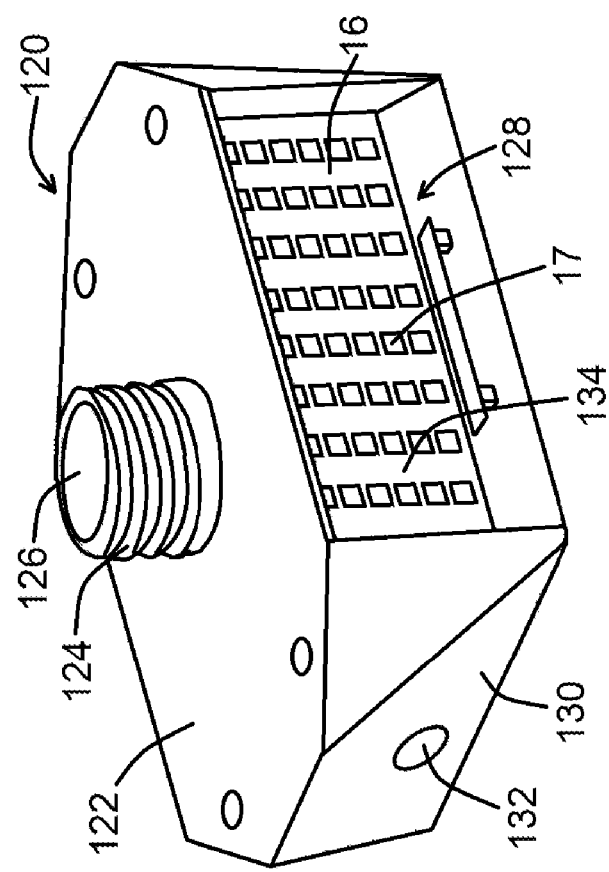
FIG. 11 shows an isometric view of a sensor unit according to exemplary embodiments of the present disclosure.
Figure 13:
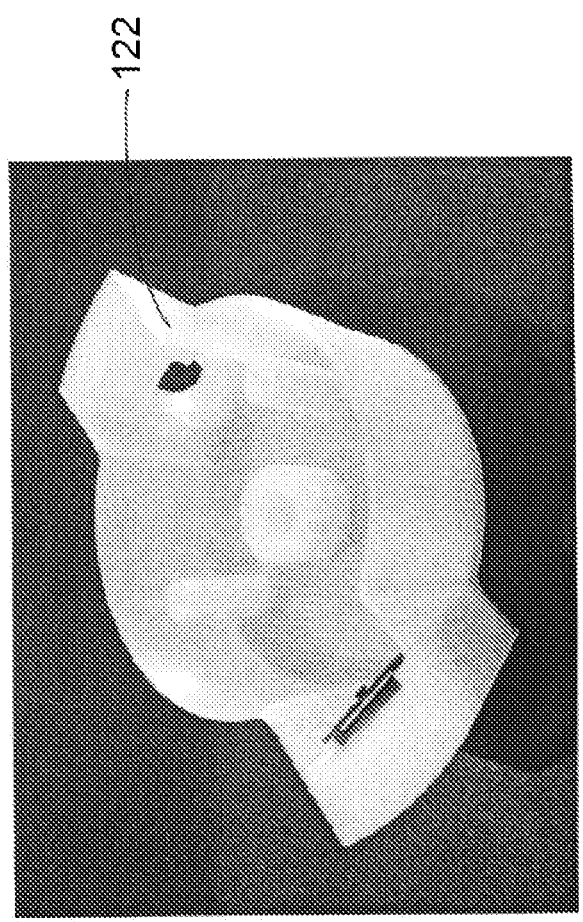
FIG. 13 shows an isometric view of a sensor unit housing according to exemplary embodiments of the present disclosure.

FIGS. 9-11 show exemplary views of the sensor unit 120 and sensor unit housing 122. As shown therein, the sensor unit housing 122 may include/comprise a boss 124 by which the sensor unit 120 may be attached to the fixture 13. The boss 124 may include/define a passage 126 therethrough which power and communications lines 22, 32 may pass from the power controller 20 and processor 30 to the sensor 18 and annunciator 16. The sensor unit housing 122 may include/comprise a sensor face 130 and an annunciator face 128. The annunciator face 128 may include/comprise a sensor aperture 132 formed/defined therethrough. The sensor aperture 132 enables access between the sensor 18 and the environment of the data hub 100 that the sensor 18 is monitoring. The annunciator face 128 may be/comprise a transparent or at least translucent surface that enables light emitted by the annunciator 16 to be visible outside of the fixture 13. In such an embodiment, the annunciator 16 may include/comprise an array of LEDs. FIGS. 12 and 13 show alternative embodiments of exemplary sensor unit housings 122.

Figure 14:
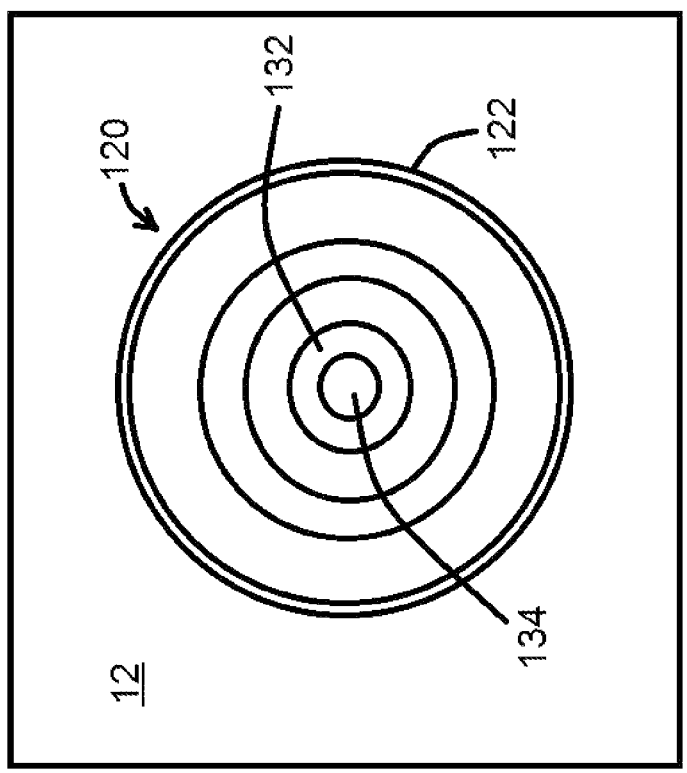
FIG. 14 shows an isometric view of a sensor unit according to exemplary embodiments of the present disclosure.

In at least one embodiment of the present disclosure, the sensor 18 may be/comprise a digital camera, including but not limited to a complementary metal-oxide-semiconductor (CMOS) camera or other suitable device. In such an embodiment, the sensor 18 may include/comprise a sensor lens 134 disposed within the sensor aperture 132 of the sensor unit 120, as shown in FIG. 14. In such an embodiment, the data hub 100 may use computer vision to monitor the environment, enabled by the camera of sensor 18 and the processor 30.

Figure 15:
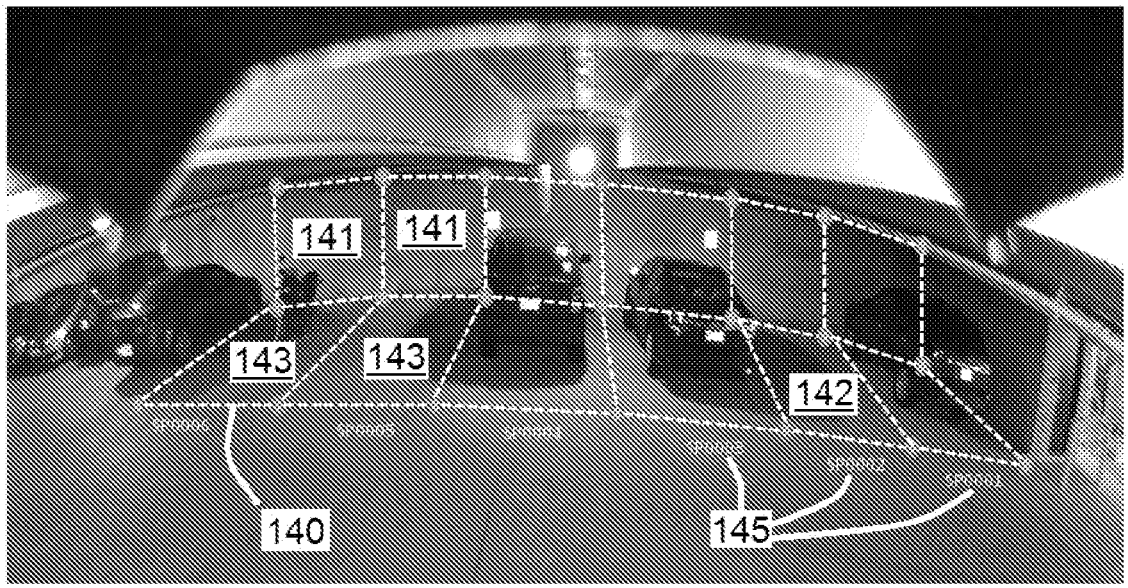
FIG. 15 illustrates a calibration mode of an occupancy analysis program according to exemplary embodiments of the present disclosure.

Using the sensor 18 in a calibration mode, for example, the processor 30 may generate a grid 140 of potential parking spaces 142, as shown in FIG. 15. Grid 140, as shown in FIG. 14, can identify general outlines of a parking surface 141 and/or a wall adjacent to a parking surface 143, such that a parking space 142 corresponds with the area(s) defined by outlines of parking surface 141, for example. Parking space identifiers 145 can also be generated using processor 30, such as shown in FIG. 15, so to "name" each parking space 142 identified using an exemplary sensor 18. The parking spaces 142 identified within a particular grid 140 may also be referred to herein as a zone 150 (such as shown in FIG. 20), whereby a zone 150 represents the parking spaces 142 monitored (or monitorable) using a data hub 100 of the present disclosure.

Figure 16:
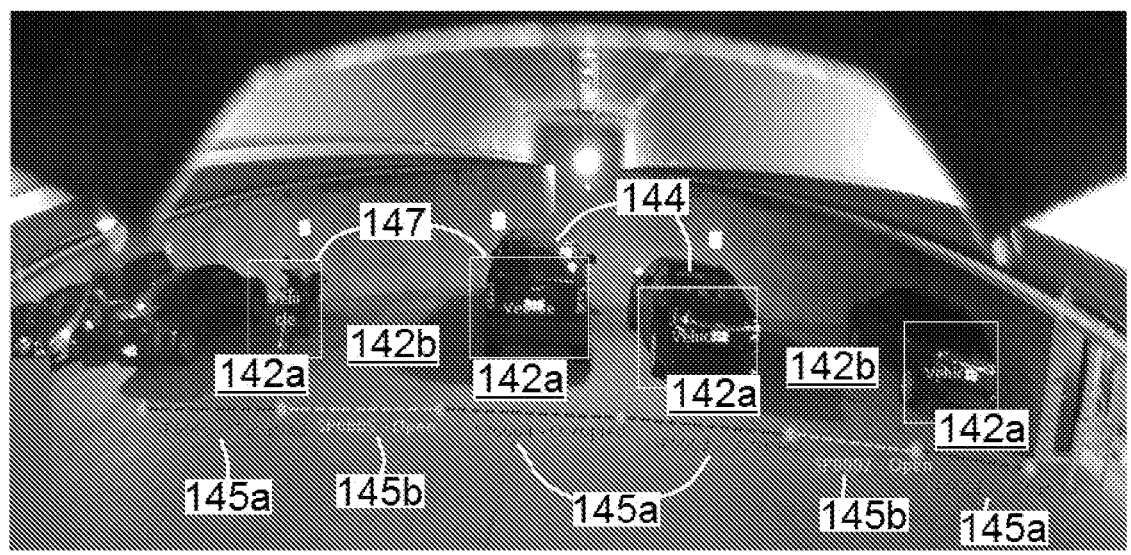
FIGS. 16-20 illustrate execution modes of an occupancy analysis program according to exemplary embodiments of the present disclosure.

The processor 30 may periodically or continuously monitor the grid 140 to determine whether a specific space 142 is occupied or available, as shown in FIG. 16. For example, and as shown in FIG. 16, processor 30 can determine which parking spaces 142 are occupied (identified as parking spaces 142a) and which parking spaces 142 are available/vacant (identified as parking spaces 142b). Parking space identifiers 145 can also reflect whether or not a parking space 142 is occupied (parking spaces 142a, corresponding to parking space identifiers 145a, for example) or is vacant (parking spaces 142b, corresponding to parking space identifiers 145b, for example). Processor 30, in various embodiments, can also generate one or more vehicle identifiers 147, such as, for example, a graphical indication that a particular parking space 142 is occupied by a vehicle 144, as shown in FIG. 16. Vehicle identifiers 147 can appear as boxes, such as shown in FIG. 16, including an identifier therein (such as "Vehicle") or other identifier as may be desired. Furthermore, the various parking space identifiers 145, vehicle identifiers 147, and/or pedestrian identifiers 149 (referenced in further detail below) can comprise any number of colors, such as different colors to indicate the presence or absence of an available parking space 142, a vehicle 144, and/or a pedestrian 146, for example.

Figure 17:
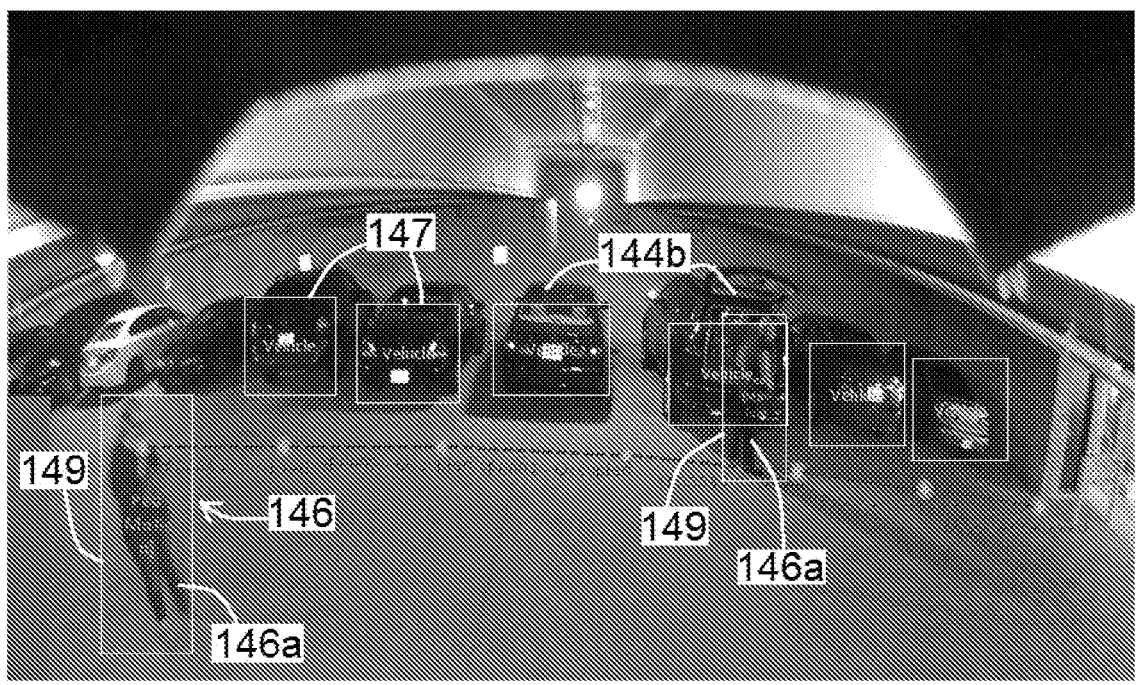
Figure 18:
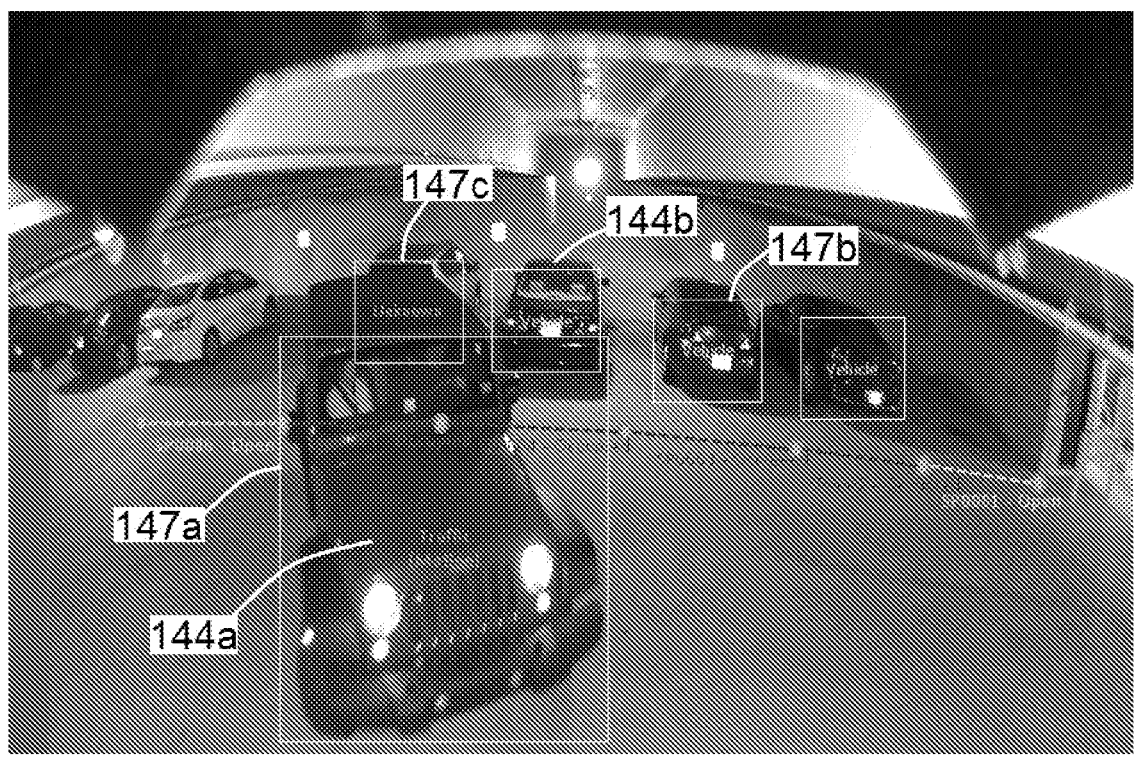
Figure 19:
Figure 20:
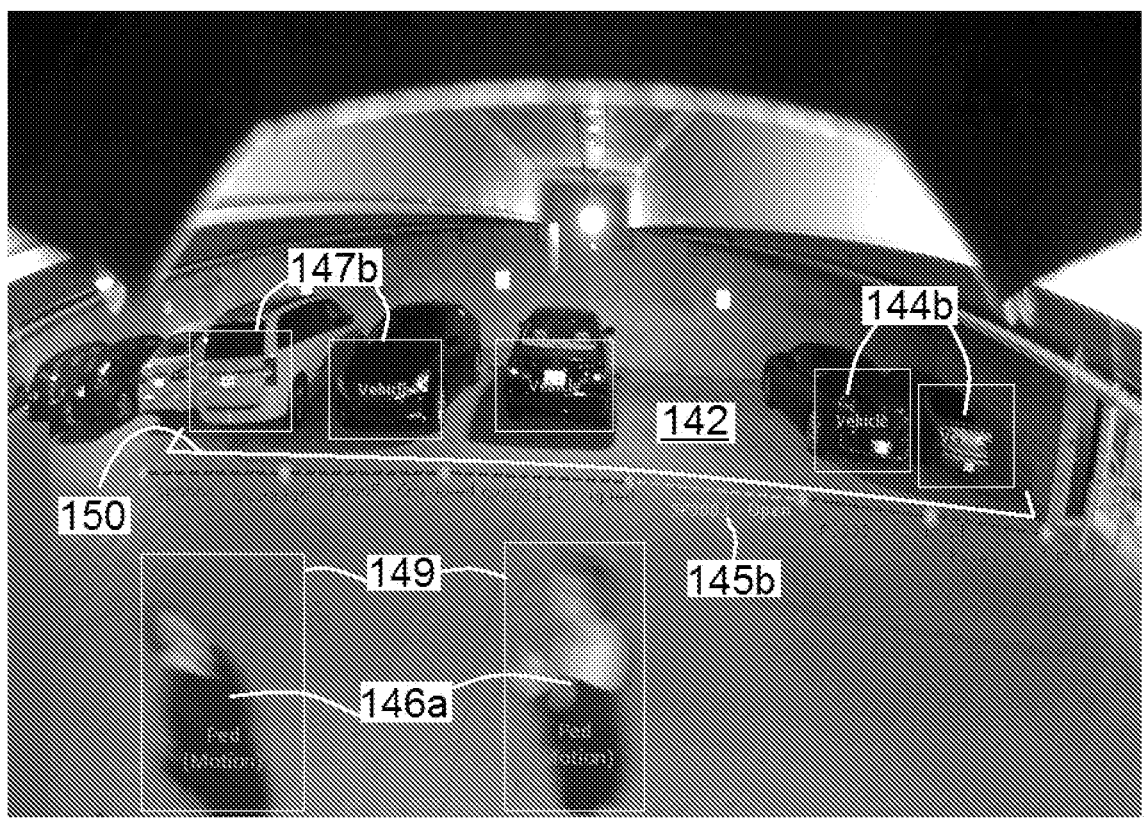

The processor 30 may further distinguish between vehicles 144 and pedestrians 146 in the field of view, as shown in FIGS. 17-20. FIGS. 18 and 19 show moving vehicles 144a as well, while FIG. 20 shows moving pedestrians 146a.

FIG. 17 shows various stationary vehicles 144b and moving pedestrians 146a. All parking spaces 142 shown in FIG. 17 are occupied, as identified by parking space identifiers 145. Processors 30 are configured to determine whether or not vehicle(s) 144 and/or pedestrian(s) 146 is/are present, and if so, whether or not said vehicle(s) 144 and/or pedestrian(s) 146 are moving (moving vehicles 144a and/or moving pedestrians 146a) or are stationary (stationary vehicles 144b and/or stationary pedestrians (not shown)).

FIG. 18 shows various stationary vehicles 144b and one moving vehicle 144a (in the foreground). As shown in FIG. 18, three vehicle identifiers 147 (shown in the figure as 147a, 147b, and 147c) identify, for example, the presence of vehicles 144 (using vehicle identifier 147a to indicate a moving vehicle identifier 147a and vehicle identifier 147b to indicate a stationary vehicle identifier 147b), while one vehicle identifier 147 (using vehicle identifier 147c) is identified as "Unknown," as sensor 18, working with processor 30, cannot readily identify the status of one of the parking spaces 142 in view because it is partially obstructed by a moving vehicle 144a. As such, processors 30, working with sensors 18 of the present disclosure, can identify whether or not a parking space 142 within the scope of a particular sensor 18 is occupied or vacant, and when a determination cannot be made regarding whether or not a parking space 142 within the scope of a particular sensor 18 is occupied or vacant, processor 30 can generate a vehicle identifier of "Unknown" or some other type of identifier that indicates that a parking space 142 status cannot be identified at that time.

FIG. 19 shows three versions of exemplary vehicle identifiers 147, including a moving vehicle identifier 147a (the truck in the foreground), stationary vehicle identifiers 147*b* (the parked vehicles that are not blocked by the truck in the foreground), and an unknown vehicle identifier 147*c*, which can be generated by processor 30 when processor 30 cannot readily identify the status of one of the parking spaces 142 in view because it is partially obstructed by a moving vehicle 144*a* or some other object or person, such as a pedestrian 146.

FIG. 20 shows two moving pedestrians 146*a*, with pedestrian identifiers 149 identifying said pedestrians 146*a*. Zone 150, as referenced above, is identified here as including or encompassing six parking spaces 142, noting that in various embodiments, zones 150 can include or encompass one, two, three, four, five, six, or more parking spaces 142. Within zone 150 shown in FIG. 20, for example, there is one vacant parking space (identified as 142 in the figure), and five parking spaces 142 that are occupied by stationary vehicles 144*b*, which are identified by sensor 18 and/or processor 30 as stationary vehicle identifiers 147*b*. The vacant parking space is identified with a vacant parking space identifier 145*b*. As shown in FIG. 20, data hubs 100 of the present disclosure can identify and distinguish between stationary vehicles 144*b* and moving pedestrians 146*a*, and as referenced herein, can identify and/or distinguish between moving vehicles 144*a*, stationary vehicles 144*b*, moving pedestrians 146*a*, stationary pedestrians 146*b*, occupied parking spaces 142*a*, and vacant parking spaces 142*b*.

By monitoring the field of view over time, the processor 30 determines whether a vehicle 144 or pedestrian 146 is either stationary or in motion. When the processor 30 determines that a vehicle 144 is stationary within a space 142 of the grid 140, the processor 30 may activate the annunciator 16 to indicate that a space 142 in the vicinity is occupied. When the processor 30 determines that a space 142 of the grid 140 is unoccupied by a stationary vehicle 144, the processor 30 may activate the annunciator 16 to indicate that a space 142 in the vicinity is available. The processor 30 may not generate an indication of space 142 occupancy if no stationary vehicle 144 is detected. When the processor 30 determines that a pedestrian 146 is in motion (a moving pedestrian 146*a*) within the field of view, the processor 30 may activate the annunciator 16 to broadcast music, current location (e.g., level or area), directions, advertising, greetings, guest information, weather warnings or alerts, emergency alerts and directions (e.g., fire, medical, assault, etc.), and Amber or Silver alerts to the passer-by.

In certain embodiments, the processor 30 is configured to activate the light source 14 and/or annunciator 16. Alternatively, the processor 30 may be configured to activate the annunciator 16, and the light source 14 may be separately controlled. The processor 30 may enable light balancing where light output of the light 14 can be adjusted, via a variable output driver, to deliver a desired output of actual light illumination. In at least one embodiment, the data hub 100 includes/comprises a battery to provide emergency lighting via the light source 14 and/or emergency messages and indication via the annunciator 16. In certain embodiments, the data hub 100 includes/comprises a global positioning system to identify the location of specific data hub 100 to aid in guidance and other functionality as described herein. The data hub 100 may include/comprise data management capability to enable information gathered by the data hub 100 to be processed and provided in desired formats to third parties interested in the data.

Figure 21A:
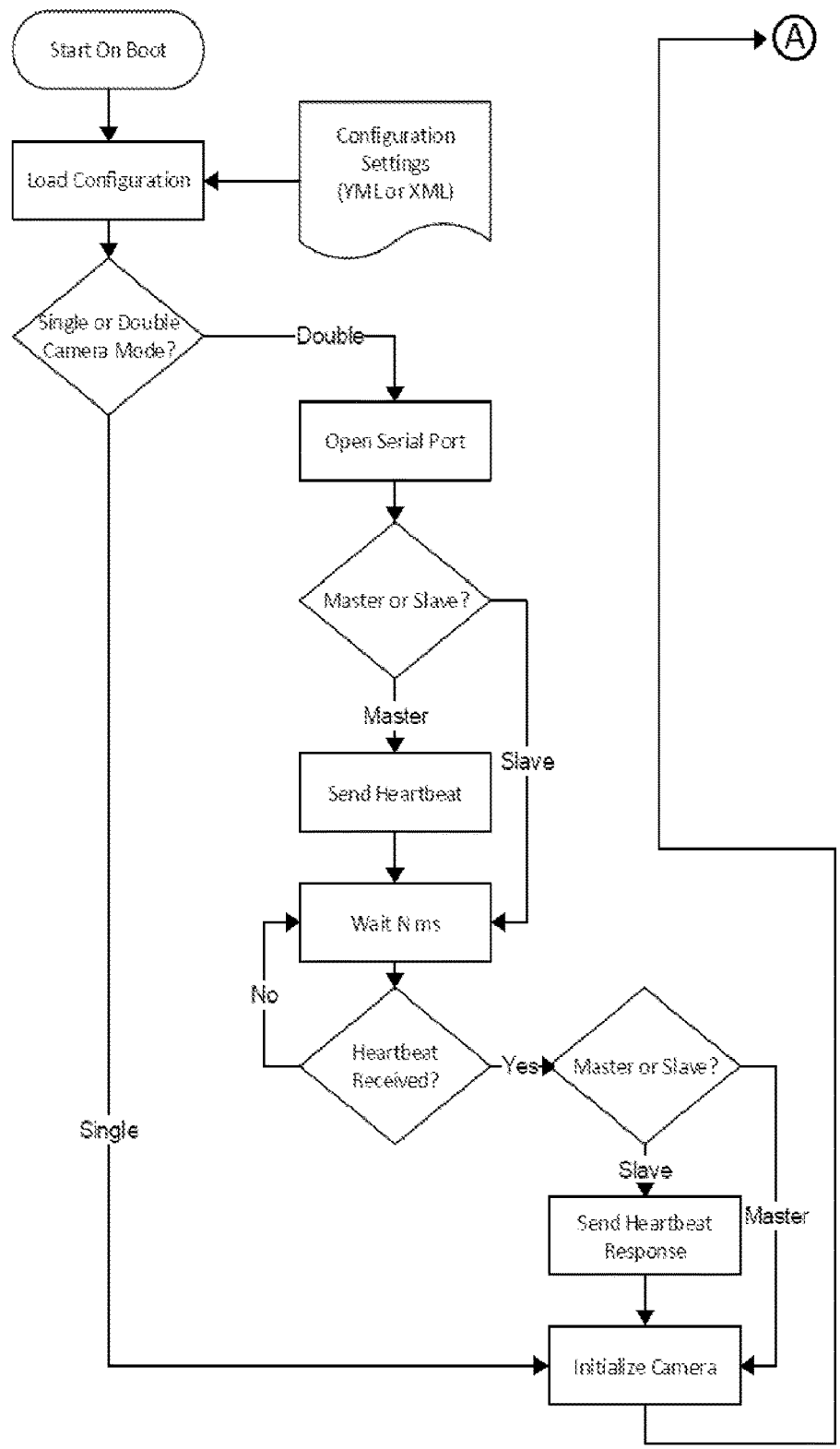
FIGS. 21A, 21B, 22, 23, and 24A show sensor logic diagrams according to exemplary embodiments of the present disclosure.
Figure 21B:
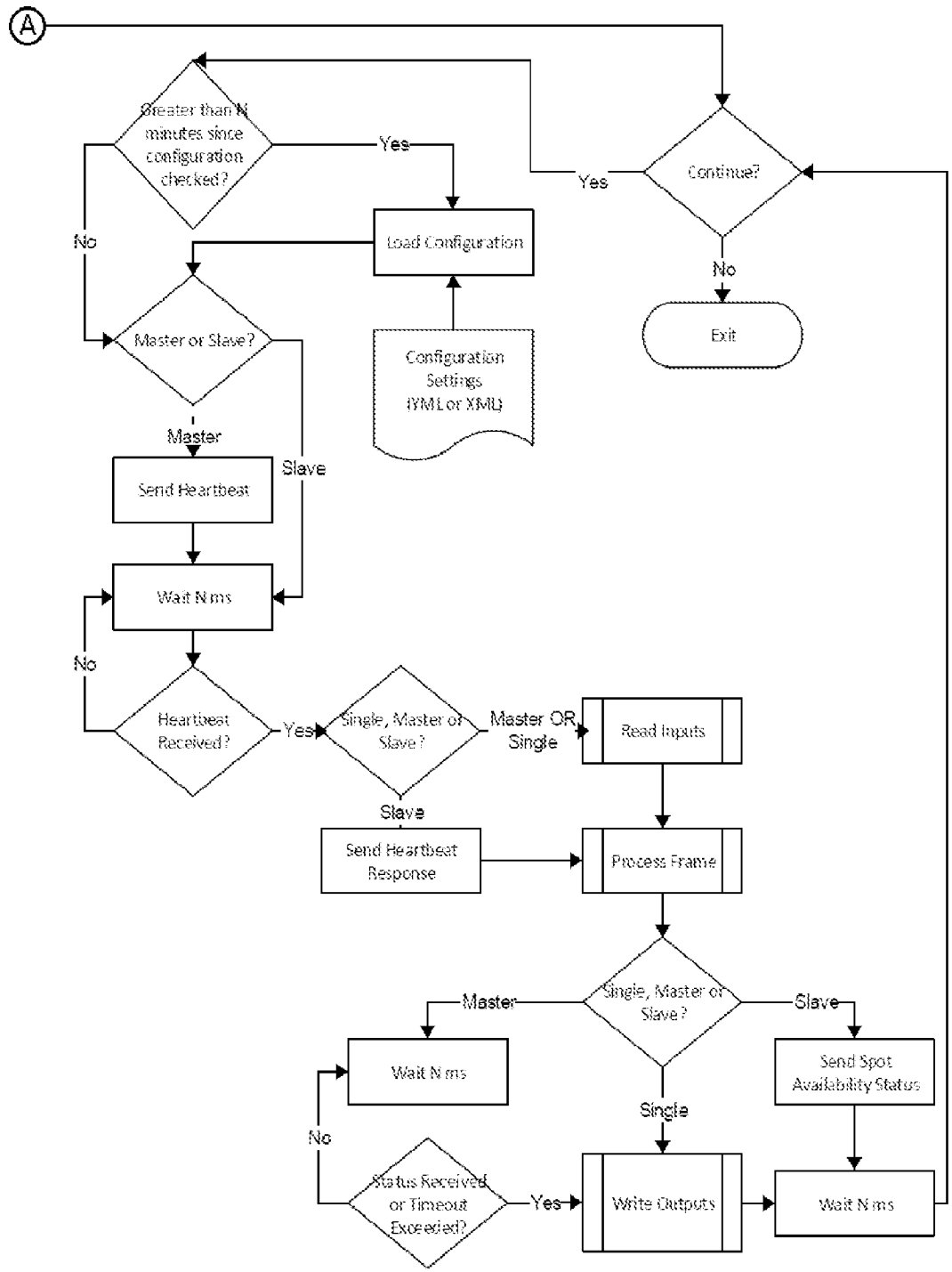

FIGS. 21A-24 illustrate control logic for the sensor 18 for an embodiment in which the processor 30 is controlling more than or one sensor 18. In certain embodiments, the processor 30 of one data hub 100 may control and operate upon the sensor signal 40 communicated from a sensor 18 disposed within a different data hub 100. For example, FIG. 21 illustrates control logic relating to general start-up of one or more data hubs 100 of the present disclosure. Various configuration settings are available, whereby different loads can be determined, such as, for example, using existing power infrastructure that powers one or more lights of a parking garage to also power one or more data hubs 100 (such as one or more light sources 14, one or more processors 30, etc.) of the present disclosure, so that no additional power lines are required. Existing power for illumination, for example, can also power a processor 30 and other low-voltage downstream systems as may be desired.

Single camera mode, as referenced in FIG. 21A, relates to embodiments where one camera (sensor 18) is used, and double camera mode relates to embodiments where two cameras (sensors 18) are used in conjunction with one another. For example, in an embodiment of a data hub 100 of the present disclosure having two light sources 14, one sensor 18 can be used, and in embodiments having one light source 14, two sensors 18 can be used, for example. One sensor 18 can be considered as the master sensor 18, and the other sensor 18 can be considered the slave sensor 18, in various embodiments, a "heartbeat," or a signal, can be sent from one sensor 18 to the other 18, so to detect active operation of the sensor 18 receiving the heartbeat/signal, and a response can then be received by the sending sensor 18 to indicate that both sensors 18 are operational and in communication with one another. A master sensor 18 can communicate with a slave sensor 18 and/or to other master sensors 18 within a general vicinity, as may be desired. Sensor 18 data, such as camera images, for example, can be saved at various time increments, such as one frame per second, one frame per five seconds, thirty frames per second, one frame per ten seconds, or at larger or smaller time increments.

Figure 22:
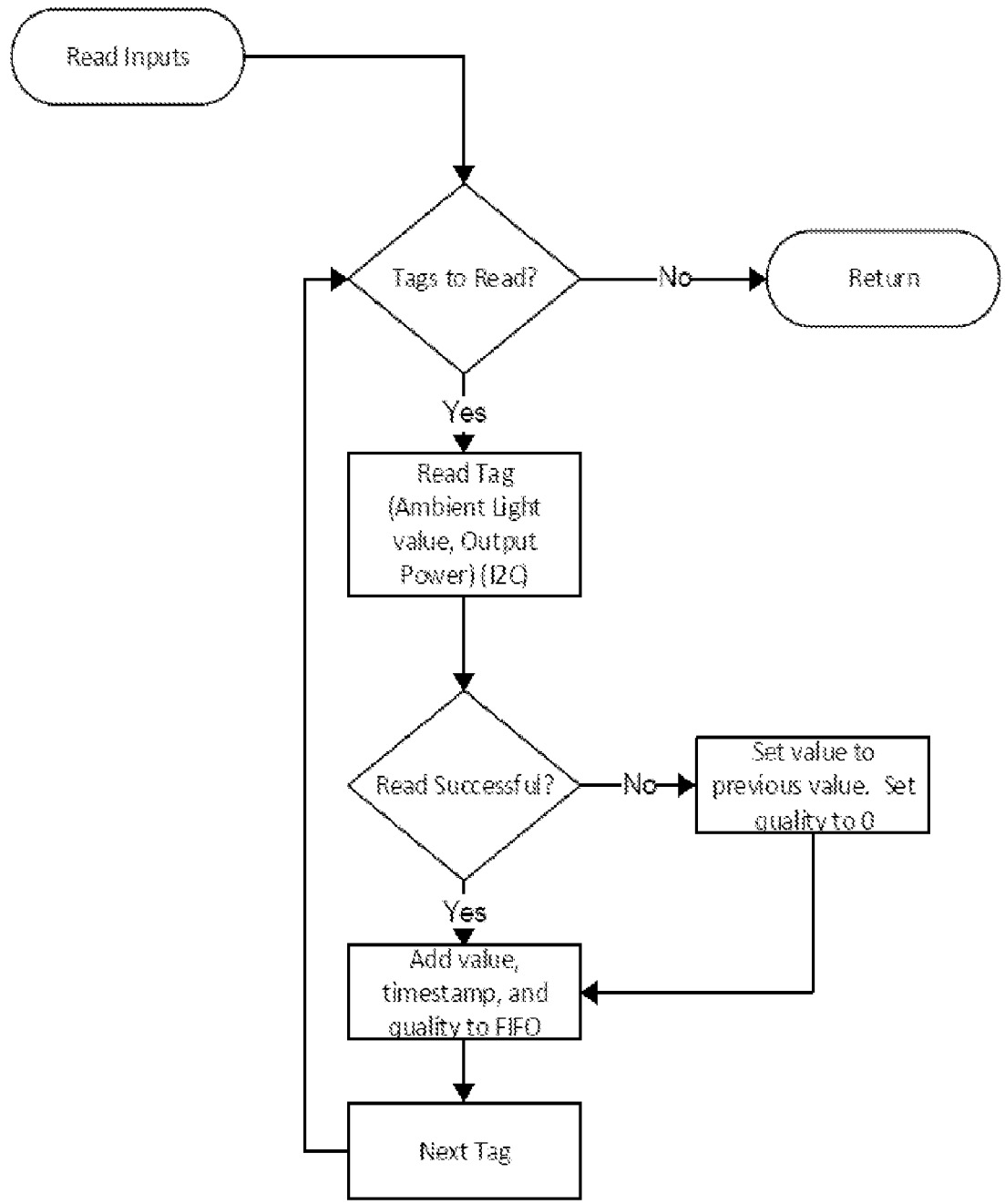
Figure 37:
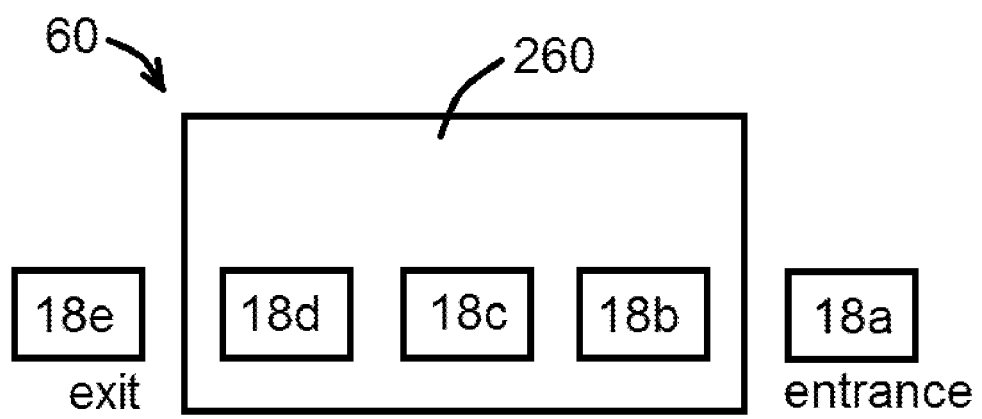
FIG. 37 shows sensors of a system inside and outside of a parking lot or garage according to exemplary embodiments of the present disclosure.

FIG. 22 illustrates control logic for various read inputs of the present disclosure, such as read inputs relating to tags, including but not limited to license plates/tags. Sensors 18 of the present disclosure, as referenced herein, are configured to operate to do one or more of a) detecting parking spaces 142, such as occupied parking spaces 142*a* and vacant parking spaces 142*b*, b) detecting vehicles 144, such as moving vehicles 144*a* and stationary vehicles 144*b*, c) detecting pedestrians 146, such as moving pedestrians 146*a* and stationary pedestrians (not shown), and d) detect other items, such as license plate tags, referenced in FIG. 22. Sensors 18, working with processors 30, can detect a license plate/tag when vehicle 144 enters a garage, as it travels through the garage and parks, and when it leaves the parking space 142 and exits the garage. Various sensors 18 and processors 30 (of various data hubs 100) can work together, such as shown in FIG. 7 or 37, for example, so to detect entry, parking, and exit of various vehicles 144 within one or more parking garages. Sensors 18 can operate as license plate recognition (LPR) devices, whereby, for example, processors 30 can directly or indirectly facilitate payment for parking in connection with a particular vehicle 144, such as, for example, by way of a license plate/tag being used in connection with a payment mechanism (such as a credit card, checking account, debit card, and/or other electronic payment means) so to charge the operator or owner of the vehicle 144 for parking, as appropriate, without requiring a payment kiosk, for example. Data hubs 100 of the present disclosure can therefore identify a license plate/tag, assign a value and timestamp (as shown in FIG. 22) in connection with that license plate/tag, monitor movement and ultimate parking of the vehicle 144 having that license plate/tag, monitor exit of that vehicle 144, calculate fee(s) due for parking, and process payment for said fee(s). FIG. 37, for example, shows a diagram of a parking lot or structure 260, whereby a first sensor (shown as sensor 18*a*) is positioned at and/or directed to a relative entrance of the parking lot or structure 260, and whereby a plurality of sensors (shown as sensors 18*b*, 18*c*, and 18*d*, for example) are positioned in and/or directed to locations (such as zones 150 and/or specific parking spaces 142) within parking lot or structure 260, and whereby an additional sensor (shown as sensor 18*e*) is positioned at and/or directed to a relative exit of parking lot or structure 260. Using such a system 60, a vehicle 144 can enter parking lot or structure 260, and a processor 30 in communication with sensor 18*a* can identify vehicle 144 by LPR or otherwise, and associate the identified vehicle 144 with a date and time of entry. Sensors 18*b*, 18*c*, 18*d*, and/or other sensors 18 can effectively follow identified vehicle 144 through the parking lot or structure 260 until vehicle 144 parks, for example, as vehicle 144 has been identified by system 144, and the identification can be communicated to sensors 18*b*, 18*c*, 18*d*, and/or other sensors 18. The specific parking space 142 used by vehicle 144 can also be identified. Sensors 18*b*, 18*c*, 18*d*, and/or other sensors 18 can then effectively follow vehicle 144 from the parking space 142 to the exit of the parking lot or structure 260, whereby sensor 18*e* can detect the identified vehicle and associate the identified vehicle 144 with a date and time of exit. Portions of system 60 can then determine a parking fee owed based upon the date and time of entry, the date and time of exit, and optionally the parking space(s) 142 used, and charge the owner/operator of the vehicle 144 accordingly.

One or more of sensors 18*b*, 18*c*, and 18*d*, for example as noted above, can identify the parking space 142 used by vehicle 144. Using an application (or "app") on a smart device 105, as referenced herein, a user can find his or her parked vehicle 144 as the app can provide location information for the vehicle 144 from the sensor (18*b*, 18*c*, 18*d*, or other sensor 18) that detected the parked vehicle 144, as the location would be known by said sensor (18*b*, 18*c*, 18*d*, or other sensor 18).

Figure 23:
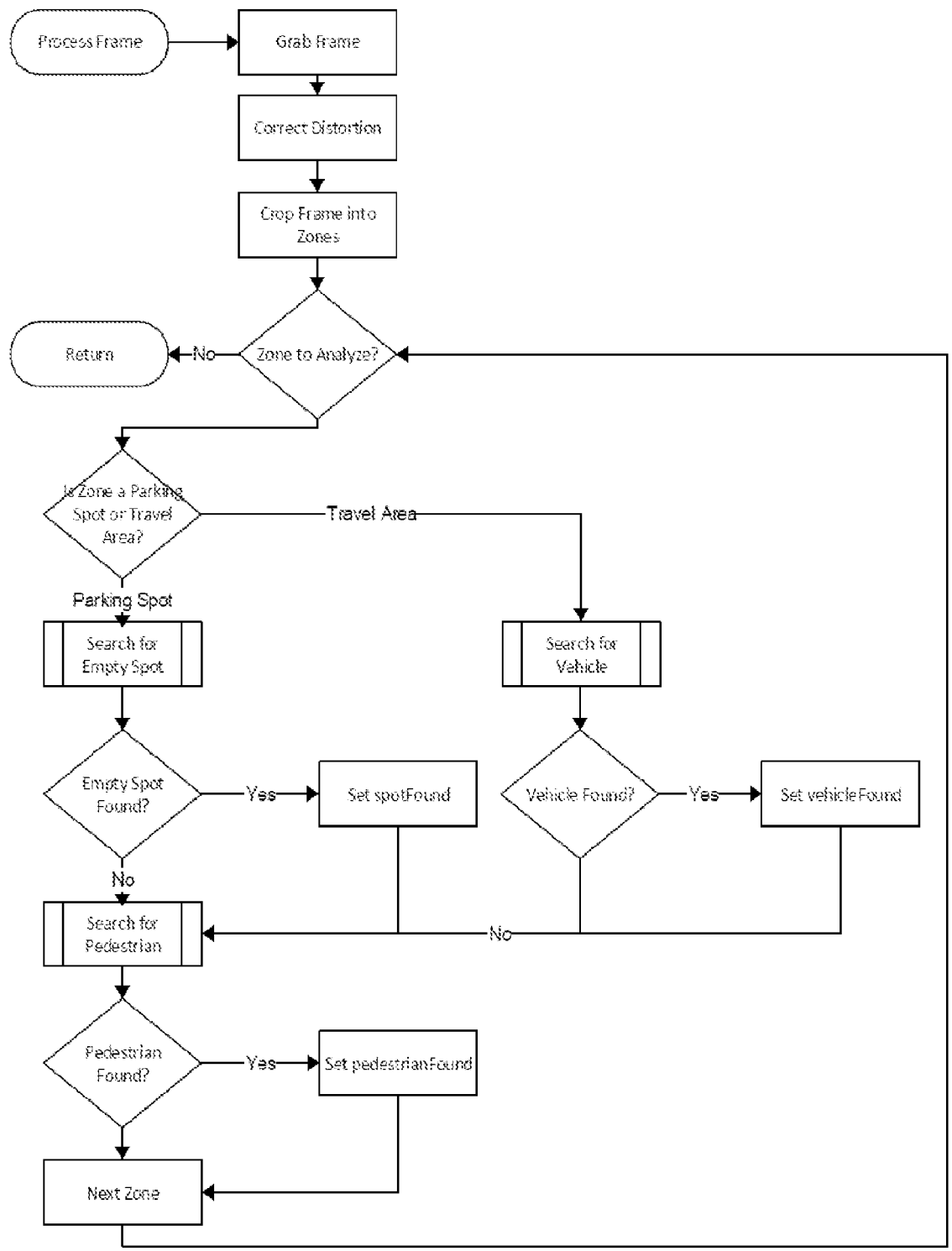

FIG. 23 illustrates control logic for various frame processes of the present disclosure, including, but not limited to, grabbing/obtaining video frames (video data), correcting distortion within the same, cropping frames into zones (so to monitor a desired number of parking spaces 142, for example), and analyzing parking spaces 142 as generally referenced herein, such as, for example, detecting the presence of vehicles 144 and/or pedestrians 146. This process can be repeated over time and for various zones, as frequently as desired.

Figure 24A:
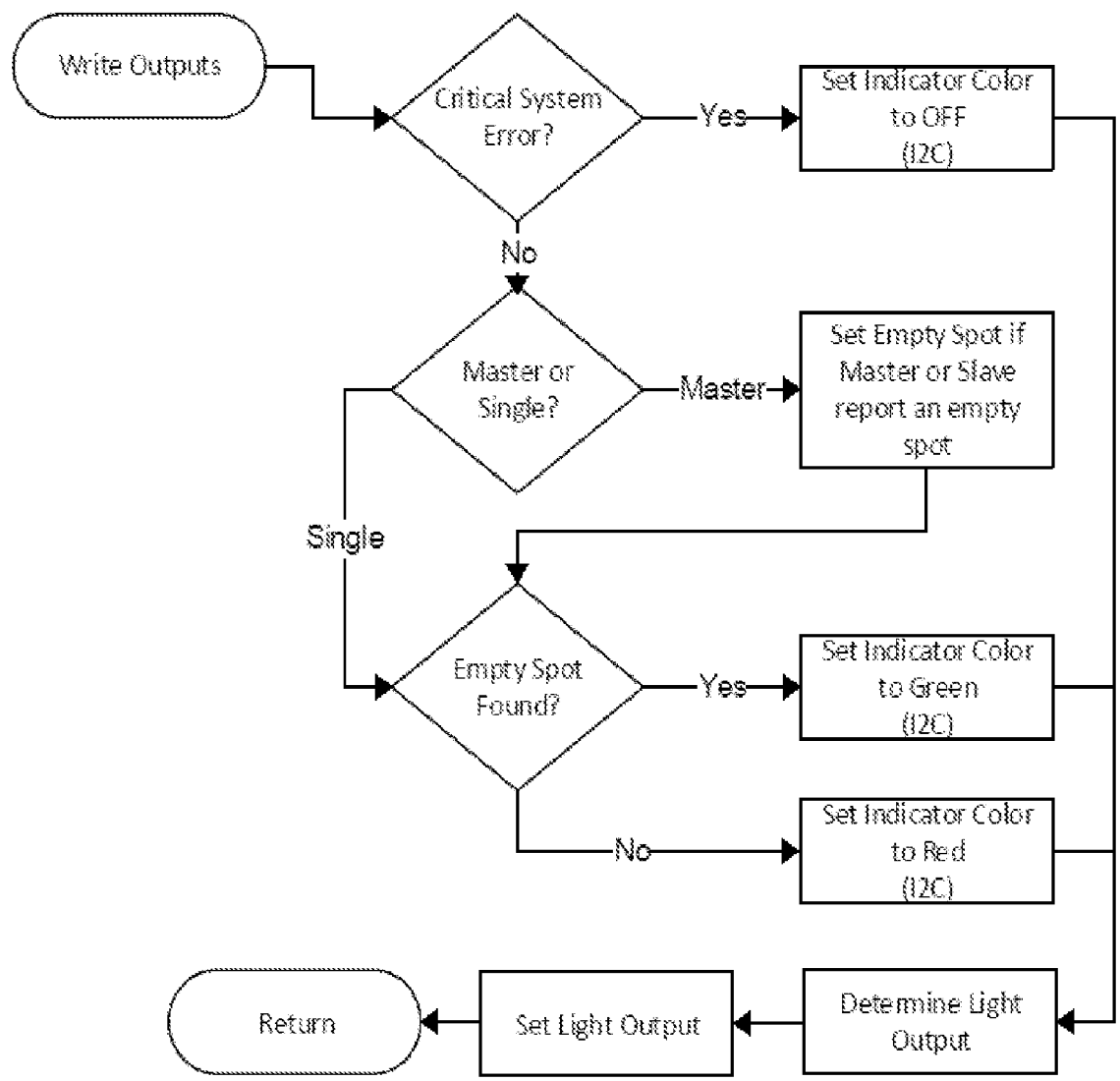

FIG. 24A illustrates control logic for various write outputs of the present disclosure, such as to eventually set one or more indicators (annunciators 16) to a desired color. For example, a data hub 100 of the present disclosure can be set to monitor a zone of six parking spaces 142, such as shown in FIGS. 15-20. Should at least one parking space 142 within said zone be available (not occupied), processor 30 could direct annunciator 16 to emit a green light, indicating that a parking space 142 is available for use within said zone, such as would be the case in FIG. 16, as two parking spaces 142 are available. Should no parking spaces 142 within a zone be available, meaning that all parking spaces 142 in said zone are occupied (such as shown in FIG. 17), processor could direct annunciator to emit a red light. Other light colors or uses are also contemplated herein. In various embodiments, annunciators 16 could emit a first color when one or more parking spaces 142 within a zone are available, and annunciators 16 could emit a second, different color when no parking spaces 142 within a zone are available.

FIG. 24B shows an exemplary table relating to the "determine light output" aspect of the control logic illustrated in FIG. 24A, whereby light sources 14 of data hubs 100 can be adjusted depending on a level of ambient light (which can change when it is sunny outside versus cloudy, and which also can change based on time of day), so that, for example, light sources 14 can be turned off when there is a level of ambient light (measured in foot-candles, for example) high enough so not to require light sources 14 to be on, turned on when ambient light is low, generally non-existent, or at certain times of the day, and adjusted from 100% to a level below 100% (such as 25% or 50%, for example), so that some light is emitted by light sources 14 but done in an energy efficient manner. For example, should a sensor 18 detect a relatively low ambient light level, said detection can be relayed/transmitted to processor 30, whereby processor 30 can cause light source 14 to either fully illuminate, partially illuminate, or illuminate at a higher level than a then-current level of illumination. Should a sensor 18 detect a relatively high ambient light level, said detection can be relayed/transmitted to processor 30, whereby processor 30 can cause light source 14 to discontinue illumination, partially illuminate, or illuminate at a lower level than a then-current level of illumination. The table shows current LED (light source 14) output power as off, low, and high, the ambient light value as being high (45 foot-candles) or neutral (35 foot-candles), motion timer activity with default settings, and output power with off, low, and high output settings, for various scenarios. Control can also send signals to adjust light output based upon vehicle 144 and/or pedestrian 146 motion, and control levels can be variable, such as 0-10 volt, as well as in various steps as referenced herein.

Figure 25:
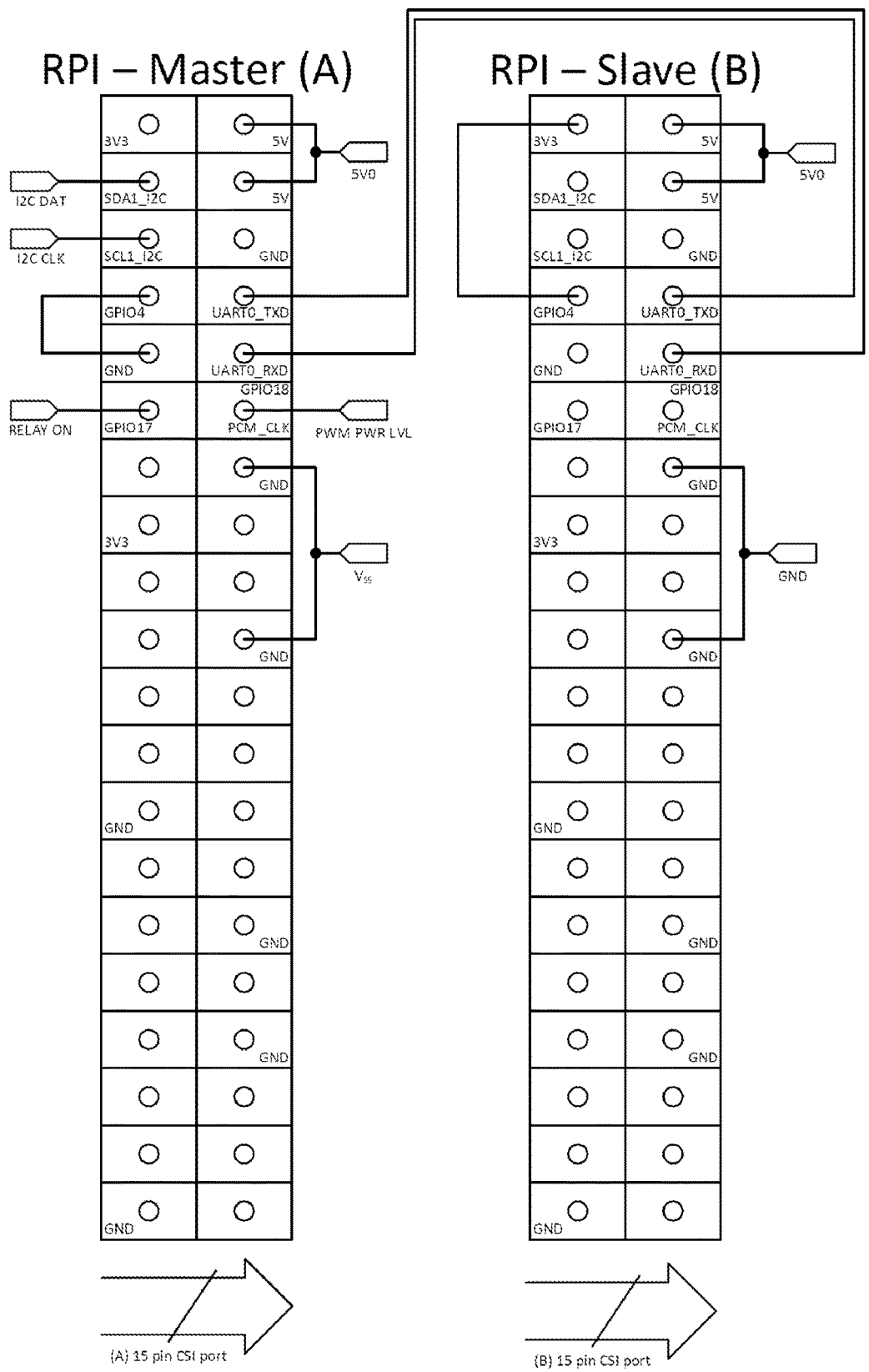
Figure 26:
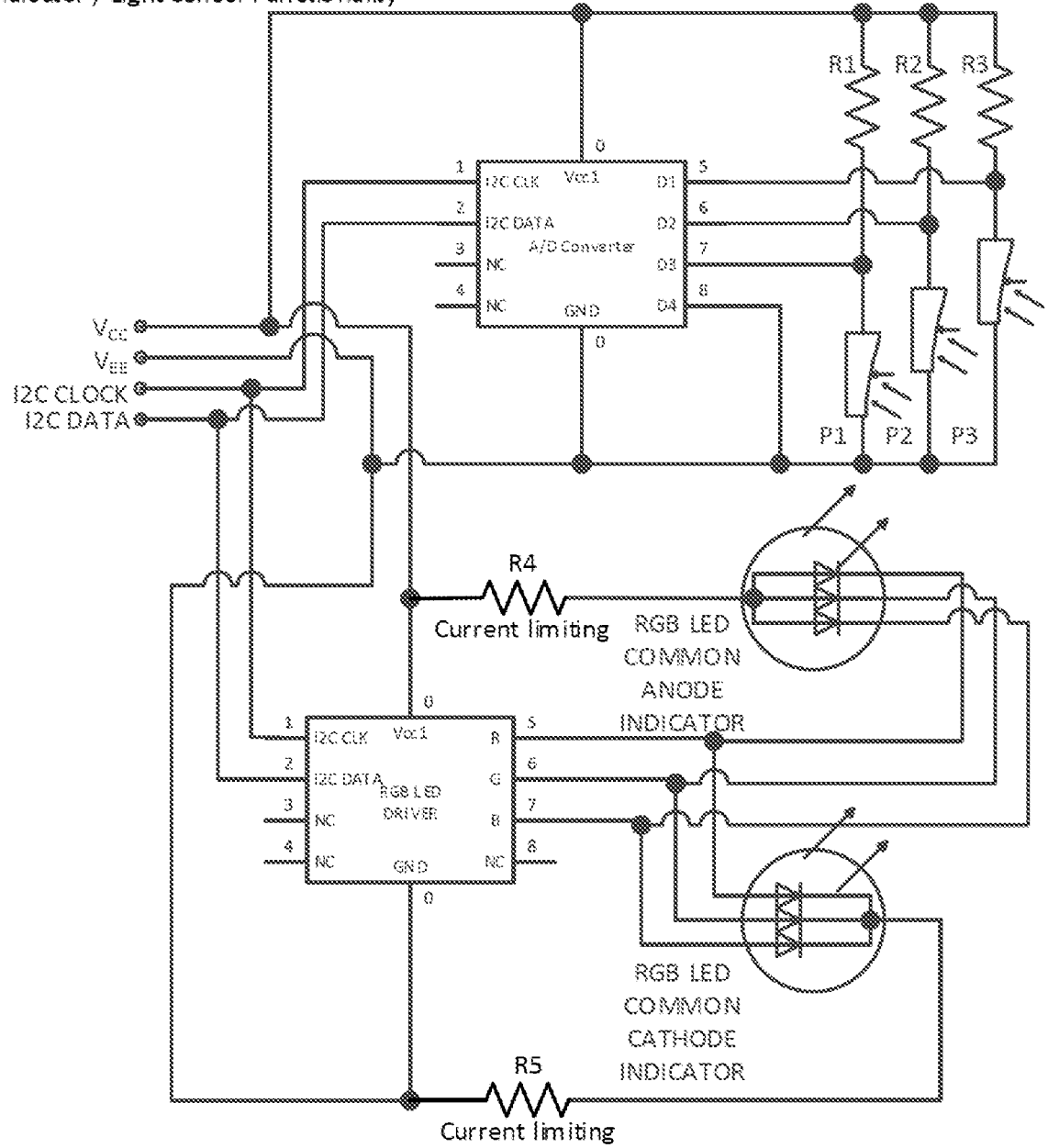
Figure 27A:
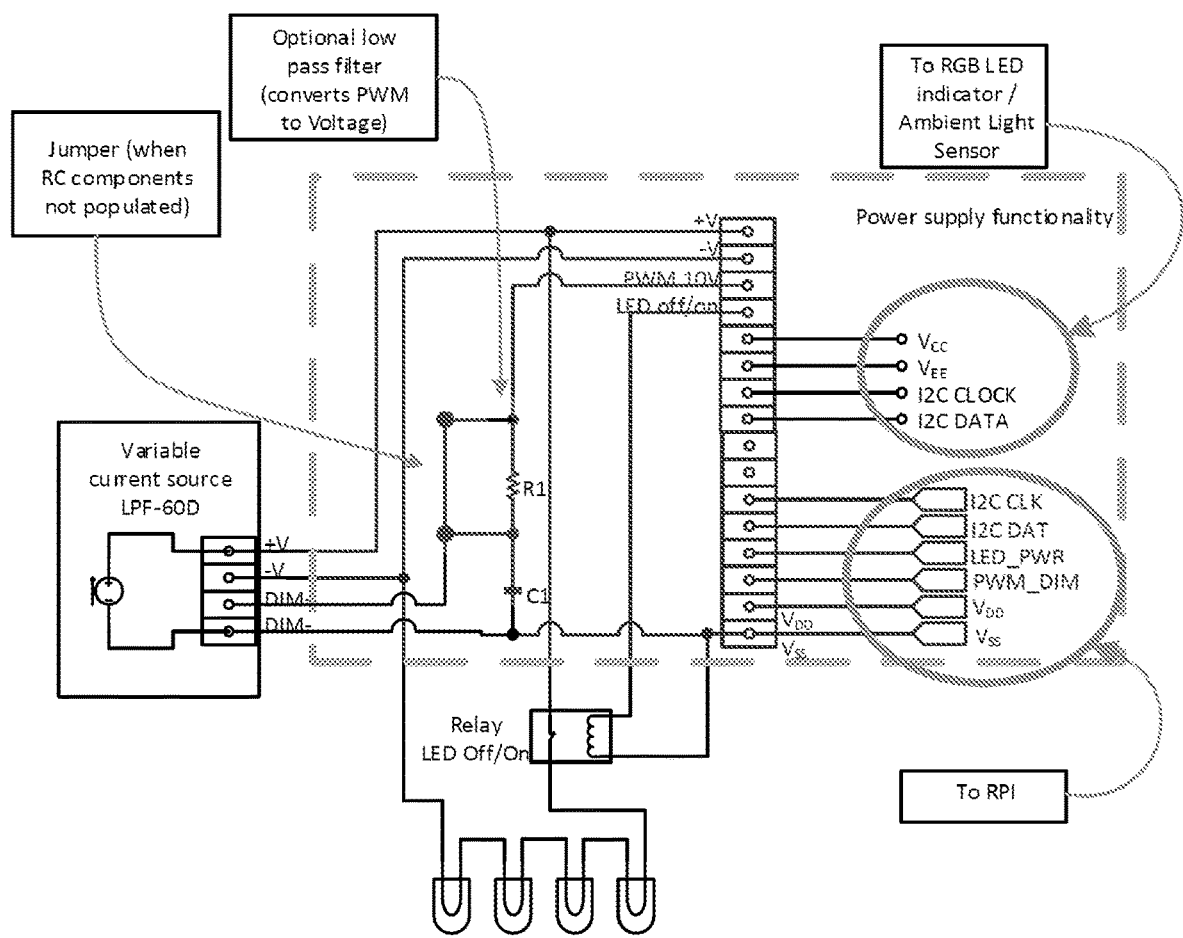

FIGS. 25-27 show electrical diagrams for a sensor unit 120 according to exemplary embodiments of the present disclosure, including various components as shown therein.

The processor 30 may be structured/configured to control and command the data hub 100. In certain embodiments, the processor 30 may be a portion of a processing subsystem including one or more computing devices having memory, processing, and communication hardware associated with the network 62, data hub mesh network 102 and/or server 64. The processor 30 may be a single device or a distributed device, and the functions of the processor 30 may be performed by hardware or software. The processor 30 may comprise digital circuitry, analog circuitry, or a hybrid combination of both of these types. The processor 30 may include/comprise one or more Arithmetic Logic Units (ALUs), Central Processing Units (CPUs), memories, limiters, conditioners, filters, format converters, or the like which are not shown to preserve clarity.

Further, the processor 30 may be programmable, an integrated state machine, or a hybrid combination thereof. In at least one embodiment, the processor 30 is programmable and executes algorithms and processes data in accordance with operating logic that is defined by programming instructions such as software or firmware, whereby said software or firmware can be stored within storage medium 65 as referenced herein. Alternatively or additionally, operating logic for the processor 30 may be at least partially defined by hardwired logic or other hardware. It should be appreciated that the processor 30 may be exclusively dedicated to controlling the activation of the light source 14 and/or annunciator 16 or may further be used in the regulation, control, and/or activation of one or more other subsystems or aspects of the data hub 100.

The processor 30 may include/comprise system self-monitoring and diagnosis and may employ learned intelligence with computer vision, including methods for acquiring, processing, analyzing, and understanding images from the sensor 18 and high-dimensional data from the environment in the vicinity of the data hub 100 to produce numerical or symbolic information, for example, in the forms of decisions. Learned intelligence allows image processing and select data transfer at the level of the data hub 100 instead of sending raw data to local/non-local processor for interpretation and action. Learned intelligence and subsequent immediate action eliminates unnecessary data transfer, which reduces congestion and the bandwidth required for subsequent communication. Learned intelligence allows the data hub 100 to response to existing conditions instead of relying on a set of established rules or developed algorithm pushed to the data hub 100 from an external processor or server. In such an embodiment, the data hub 100 transfers (i.e., pushes, pulls and syncs) only needed information in a form as specifically requested by the PCS 60 instead of handling large quantities of unwanted data in a "data dump." In certain embodiments, the data hub 100 and processor 30 transfer data via a capable open protocol, which may appeal to a broader range of potential markets and PCS developers.

In certain embodiments, the processor 30 includes/comprises one or more modules structured/configured to functionally execute the operations of the processor 30. In at least one embodiment, the communication module 34 may be included in or integral with the processor 30. The description herein including modules emphasizes the structural independence of the aspects of the processor 30, and illustrates one grouping of operations and responsibilities of the processor 30. Other groupings that execute similar overall operations are understood within the scope of the present disclosure. Modules may be implemented in hardware and/or software on a non-transient/transitory computer readable storage medium, and modules may be distributed across various hardware or software components.

In at least one embodiment, the light source 14 is at least one LED. In at least one embodiment of the present disclosure, the light source 14 is a high-output white light LED, such as the XP-G LED manufactured by Cree, Inc.® However, many possible LED light sources are operable in the system, including, but not limited to, Cree® CXA and MLE products. The at least one LED may be in thermal contact with a heat sink, to which the LED is fixed by any suitable means of attachment, such as at least one machine screw, a thermally conductive adhesive, or similar means.

In other embodiments, the light source is an induction fluorescent light source including an electrodeless tube filled with a mixture of inert gas and mercury vapor. Such fluorescent lighting technology is well-known in the art, and examples include ICETRON® products from Osram-Sylvania. In such an embodiment, the light source 14 includes/comprises at least one induction coil surrounding a portion of the electrodeless tube. One or more mounting bands surround the at least one induction coil and attach the light source 14 to a mounting surface, which in turn may be attached to the housing 10. The mounting surface may include/comprise a reflective surface at least on the side adjacent the light source 14 capable of reflecting incident light from the light source 10.

In at least one embodiment, the data hub 100 may include, comprise, or have coupled thereto a discharge unit 70, whereby discharge unit 70 is structured/configured to discharge a desired scent or fragrance from a source of scent/fragrance 72, such as shown in FIG. 28. The fragrance may be any suitable means, for example as an atomized. If a person is detected as getting out of the car, as they pass the fixture, discharge unit 70 could discharge a fragrance, like "Summer Breeze", or "Spring Rain", a refreshing odor, or it could do a smoky barbeque smell that is announced as an ad to Weber Grill, for example, and a lunch special. The data hub 100, knowing whether the current time is near lunch or dinner time, may discharge a fragrance that evokes food and stimulates hunger. In an embodiment, a parking facility or a parking facility operator may have a specific fragrance (from a source of scent/fragrance 72) that is discharged as desired.

The present disclosure, as generally referenced herein, includes disclosure relating to various devices and systems that can be readily integrated into an existing light fixture 200. Traditional parking guidance systems known in the art are all stand-alone systems, requiring their own fixture mechanisms (to a parking garage ceiling, for example), dedicated power lines/sources, and the like. Contrary to those existing systems, data hubs 100 of the present disclosure, in various embodiments, are configured as integrated systems, such as comprising a combination of a fixture 13 with a light source 14 and the elements of an exemplary data hub 100 (such as sensors 18, annunciators 16, processors 30, and the like), or as a system that can be a quick addition to an existing light fixture 200, such as described in further detail below, so to simplify installation of the same. Said systems (data hubs 100) are vision-based, using various sensors 18 referenced herein, and capitalize on learned intelligence (as referenced above) and various data hub mesh networks 102, also as referenced herein, for efficient operation and so to drive revenues of parking structure/location owners/operators.

In various embodiments of data hubs 100 of the present disclosure, data hubs 100 are configured to attach to an existing light fixture 200, such as shown in block format in FIG. 28. As shown in FIG. 28, light fixture 200 is positioned relatively above data hub 100, whereby data hub 100 includes (and/or has coupled thereto) various elements referenced herein including, but not limited to, one or more annunciators 16, one or more sensors 18, one or more power controllers 20, one or more DAQ modules 28, one or more processors 30, one or more communication modules 34, one or more transceivers 36, one or more receivers 38, and/or one or more sensor units 120, and the like, as referenced herein. Said elements can be within, or coupled to, a housing 10.

FIG. 29 shows an exemplary data hub 100 of the present disclosure, whereby various elements/components are present within and/or coupled to a housing 10, and whereby housing 10 is configured to attach to a fixture 13 (similar to an existing light fixture 200 of a parking garage, for example). Fixture 13, in such an embodiment, can contain one or more light sources 14, and be configured to receive housing 10.

It is noted that in various embodiments of data hubs 100 of the present disclosure, various components, including but not limited to one or more light sources 14, one or more annunciators 16, one or more sensors 18, one or more power controllers 20, one or more DAQ modules 28, one or more processors 30, one or more communication modules 34, one or more transceivers 36, one or more receivers 38, and/or one or more sensor units 120, and the like, can be positioned within housing 10 and/or fixture 13, in various configurations, as may be desired.

Furthermore, various data hub 100 embodiments of the present disclosure can include one, two, three, or more sensors 18, which can be operated using one, two, three, or more processors 30. In various embodiments, sensors 18 can comprise cameras with resolutions of 1920×1080 (having an aspect ratio of 16:9), 2592×1944 (having an aspect ratio of 4:3), 1296×972 (also having an aspect ratio of 4:3), 1296×972 (also having an aspect ratio of 4:3), 1296×730 (also having an aspect ratio of 16:9), 640×480 (also having an aspect ratio of 4:3), or other resolutions and corresponding aspect ratios, operating at ⅙ frame per second up to 90 frames per second, or faster or slower as may be desired, and configured to obtain and/or generate video data/signals 40 and/or audio data/signals 40, as may be desired.

FIGS. 30-34 show various additional embodiments of a sensor unit housing 122 for a data hub 100 of the present disclosure. FIG. 30 shows a side view of a sensor unit housing 122 having a sensor aperture 132 defined therein, whereby sensor face 130 (also shown in FIG. 33) having sensor aperture 132 defined therein is configured to have a tapered angle (less than 90° relative to a top of sensor unit housing 122) so that sensor aperture 132, and therefore a sensor 130 positioned within sensor unit housing 122 at sensor aperture 132, angles downward. FIG. 31 shows another side view of a sensor unit housing 122 having an annunciator aperture 127 defined therein, whereby annunciator face 128 (also shown in FIG. 33) having annunciator aperture 127 defined therein is also configured to have a tapered angle (less than 90° relative to a top of sensor unit housing 122) so that annunciator aperture 127, and therefore an annunciator 16 positioned within sensor unit housing 122 at annunciator aperture 127, angles downward.

FIG. 32 shows an exemplary housing lid 180 having a boss 124 (as previously shown and described with other embodiments), whereby housing lid 180 is configured to couple to a relative top of housing 122, and whereby boss 124 is configured to couple (such as rotatably due to threads of an exemplary boss 124) to a light fixture 200, for example, and to allow wires (such as power line(s) 22 and/or communication line(s) 32) to pass from light fixture 200 (or another element) through passage 126 of boss 124 into housing 122. A nut 125, such as shown in FIG. 32, can be positioned within the device that lid 180 is intended to be coupled to, such as within housing 10, fixture 13, or light fixture 200, and threaded onto boss 124 of lid 180 so to secure device lid 180, and therefore housing 122, to said device.

FIG. 33 shows a perspective view of an exemplary sensor unit housing 122 of the present disclosure, showing sensor apertures 132 on opposite sides of sensor unit housing 122 and annunciator apertures 127 on the other opposite sides of sensor unit housing 122. In at least one embodiment of a sensor unit housing 122 of the present disclosure, and starting with one side, there is a first sensor aperture 132 on a first side (a first sensor face 130), then a first annunciator aperture 127 on a second side adjacent to the first side (a first annunciator face 128), then a second sensor aperture 132 on a third side (a second sensor face 130) adjacent to the second side, then a second annunciator aperture 127 on a fourth side adjacent to the third side (a second annunciator face 128), for example. FIG. 34 shows an expanded detail view of portion B of FIG. 33, so that sensor aperture 132 can be readily viewed.

Various elements referenced herein including, but not limited to, one or more annunciators 16, one or more sensors 18, one or more power controllers 20, one or more DAQ modules 28, one or more processors 30, one or more communication modules 34, one or more transceivers 36, one or more receivers 38, and/or one or more sensor units 120, and the like, as referenced herein, may be partially or fully enclosed within, or coupled to, exemplary sensor housings 122 of the present disclosure. Sensor housings 122 of the present disclosure, in various embodiments, are configured to be devices that add on to existing light fixtures 200 or other elements, such as housings 10 and/or fixtures 13, as may be desired.

In addition to the foregoing, various data hubs 100 of the present disclosure can comprise a plug or port 55, such as shown in FIG. 1, configured to charge an electronic device or object, such as, for example, an electric vehicle. Plug or port 55 can be defined within or extend from various portions of data hubs 100 of the present disclosure, such as, for example, housing 10, cover 12, fixture 13, sensor unit housing 122, and the like. Power from power line 22 can be directly provided to plug or port 55, or indirectly provided to plug or port 55 by way of power controller 20 configured to provide and/or regulate power from power line 22 to plug or port 55.

While various embodiments of a lighting fixture data hub have been described in considerable detail herein, the embodiments are merely offered by way of non-limiting examples of the disclosure described herein. For example, though various components of a lighting fixture data hub have been depicted to be generally angularly shaped in the plan view, these components could have other general shapes such as circular, hexagonal, or other suitable or desire shape. As another example, the light sources disclosed with respect to a lighting fixture data hub include/comprise induction fluorescent and LED lamps. Nonetheless, a lighting fixture data hub of the present disclosure may be configured to convert to any lighting system that uses a light source and associated power controller. It will therefore be understood that various changes and modifications may be made, and equivalents may be substituted for elements thereof, without departing from the scope of the disclosure and are intended to encompass any later appended claims. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. Such sequences may be varied and still remain within the scope of the present disclosure.

The invention claimed is:

1. A data hub comprising:
   an annunciator configured to generate a first indication and a second indication;
   a sensor configured to detect a zone comprising a plurality of parking spaces in a vicinity of the data hub and to determine whether or not one or more vehicles and/or one or more pedestrians are present within the zone, the sensor further configured to emit one or more signals corresponding to said detection;

a processor in communication with the annunciator and the sensor, the processor configured to receive the one or more signals from the sensor and operable to direct the annunciator to generate the first indication or the second indication in response to the signal, the processor further configured to distinguish between the one or more vehicles and the one or more pedestrians;

a sensor unit housing having at least portions of the annunciator, the sensor, and the processor located therein, the sensor unit configured to attach to a device such that power supplied to the device is also used to supply power to the data hub; and a light source in communication with the processor, the light source configured to illuminate at least a portion of the zone with white light of varying intensities.

2. The data hub of claim 1, wherein the annunciator is further configured to generate a third indication and a fourth indication;

wherein the first indication is emitted light of a first color, the first color indicating an occupied parking space of the plurality of parking spaces;

wherein the second indication is emitted light of a second color, the second color indicating an available parking space of the plurality of parking spaces;

wherein the third indication is emitted light of a third color, the third color indicating a handicapped parking space; and wherein the fourth indication is emitted corresponding to detection of the one or more pedestrians.

3. The data hub of claim 1, wherein when at least one of the one or more signals corresponds to the detection of a vehicle in each parking space of the plurality of parking spaces, the processor is operable to direct the annunciator to generate the first indication, and wherein when at least one of the one or more signals corresponds to the detection of a lack of a vehicle in at least one parking space of the plurality of parking spaces, the processor is operable to direct the annunciator to generate the second indication.

4. The data hub of claim 1, further comprising:

a data controller in communication with the processor and configured to receive the at least one signal from the sensor, the data controller further configured to interrogate the at least one signal and to communicate the interrogated at least one signal to the processor; and a second sensor configured to detect at least one parking space of the plurality of parking spaces, the second sensor configured to determine whether or not one or more vehicles and/or one or more pedestrians are present within the at least one parking space of the plurality of parking spaces;

wherein the first sensor is a camera; and wherein the second sensor is not a camera.

5. The data hub of claim 4, further comprising:

a power controller configured to provide electrical power to the annunciator, the sensor, the processor, and the data controller; and a plug or port configured to charge an electric vehicle using the electrical power from the power controller.

6. The data hub of claim 4, wherein the data controller uses learned intelligence to determine whether a space is occupied and operates upon the learned intelligence to actuate the annunciator.

7. The data hub of claim 1, further comprising:

a communication module in communication with the processor, wherein the communication module is configured to communicate with a network;

wherein the network is configured to receive one or more signals from an external signal source selected from the group consisting of a fire signal source, a carbon monoxide signal source, and a smoke signal source; and wherein the communication module is further configured to transmit the one or more signal from the external signal source.

8. The data hub of claim 1, wherein the sensor unit housing comprises a boss extending therefrom and having a passage defined therethrough, the boss configured to fit within an aperture defined within the device so to attach the data hub to the device; and wherein the data hub further comprises:

a housing lid configured to couple to the sensor unit housing, the housing lid comprising a boss extending therefrom and having a passage defined therethrough, the boss configured to fit within an aperture defined within the device so to attach the data hub to the device.

9. The data hub of claim 1, wherein the light source is configured to emit light as a result of the sensor identifying pedestrian motion of a pedestrian of the one or more pedestrians.

10. The data hub of claim 1, further comprising an audio source configured to emit an audio signal, the audio signal comprising an emergency signal selected from the group consisting of a fire alarm and a distress signal, the emergency signal emitted as a result of an action initiated by a pedestrian of the one or more pedestrians present within the zone, the action being engaging a manual fire alarm switch by the pedestrian in the event of the fire alarm and operating an application of a smart device by the pedestrian in the event of the distress signal.

11. The data hub of claim 10, wherein the audio source is further configured to emit an auditory message selected from the group consisting of music, an advertisement, a greeting, guest information, weather warning, an Amber alert, and a Silver alert.

12. The data hub of claim 1, wherein the sensor is configured to obtain license plate information from a license plate of at least one vehicle of the one or more vehicles; and wherein the data hub communicates with at least one additional data hub to detect the at least one vehicle when the at least one vehicle enters a parking lot or garage, when the at least one vehicle travels through the parking lot or garage and parks in a parking space of the plurality of parking spaces, when the at least one vehicle leaves the parking space, and when the at least one vehicle exits the parking lot or garage.

13. The data hub of claim 1, forming a system, the system further comprising a second data hub located at an entrance of a parking lot or garage and a third data hub location at an exit of the parking lot or garage, wherein a second sensor of the second data hub can identify a particular vehicle upon entry of the parking lot or garage, whereby the sensor can identify a parking space within the plurality of parking spaces where the particular vehicle parks, and whereby a third sensor of the third data hub can identify the particular vehicle upon exit of the parking lot or garage.

14. The data hub of claim 13, further configured to calculate a parking fee based upon a date and time the particular vehicle entered the parking lot or garage and a date and time the particular vehicle exited the parking lot or garage.

15. The data hub of claim 1, wherein the sensor is configured to detect an ambient light level, and whereby the processor is configured to receive the detected ambient light level and direct the light source to fully illuminate, partially illuminate, or illuminate at a higher level than a then-current level of illumination.

16. The data hub of claim 1, further comprising:
a discharge unit configured to discharge a desired scent or fragrance from a source of the scent or fragrance in response to detection of a pedestrian of the one or more pedestrians within the zone.

17. A system, comprising:
a plurality of data hubs, each data hub comprising:
an annunciator configured to generate a first indication and a second indication;
a sensor configured to detect a zone comprising a plurality of parking spaces in a vicinity of the data hub and to determine whether or not one or more vehicles and/or one or more pedestrians are present within the zone, the sensor further configured to emit one or more signals corresponding to said detection;
a processor in communication with the annunciator and the sensor, the processor configured to receive the one or more signals from the sensor and operable to direct the annunciator to generate the first indication or the second indication in response to the signal, the processor further configured to distinguish between the one or more vehicles and the one or more pedestrians;
a sensor unit housing having at least portions of the annunciator, the sensor, and the processor located therein, the sensor unit configured to attach to a device such that power supplied to the device is also used to supply power to the data hub; and
a light source in communication with the processor, the light source configured to illuminate at least a portion of the zone with white light of varying intensities.

18. The system of claim 17, configured to detect a vehicle at an entrance to a parking lot or garage, configured to detect the vehicle within the parking lot or garage, configured to detect a location where the vehicle is parked within the parking lot or garage, and configured to detect the vehicle at an exit of the parking lot or garage.

19. A method for monitoring a parking zone, comprising the steps of:
operating a data hub, comprising:
an annunciator configured to generate a first indication and a second indication;
a sensor configured to detect a zone comprising a plurality of parking spaces in a vicinity of the data hub and to determine whether or not one or more vehicles and/or one or more pedestrians are present within the zone, the sensor further configured to emit one or more signals corresponding to said detection;
a processor in communication with the annunciator and the sensor, the processor configured to receive the one or more signals from the sensor and operable to direct the annunciator to generate the first indication or the second indication in response to the signal, the processor further configured to distinguish between the one or more vehicles and the one or more pedestrians;
a sensor unit housing having at least portions of the annunciator, the sensor, and the processor located therein, the sensor unit configured to attach to a device such that power supplied to the device is also used to supply power to the data hub; and
a light source in communication with the processor, the light source configured to illuminate at least a portion of the zone with white light of varying intensities;
detecting the zone using the sensor to determine whether or not one or more vehicles and/or one or more pedestrians are present within the zone;
emitting one or more signals corresponding to said detection; and
generating one of the first indication and the second indication using the annunciator based upon the emitted one or more signals, wherein the generation is facilitated by the processor.

20. The method of claim 19, wherein the annunciator is further configured to generate a third indication;
wherein the first indication is emitted light of a first color, the first color indicating an occupied parking space of the plurality of parking spaces;
wherein the second indication is emitted light of a second color, the second color indicating an available parking space of the plurality of parking spaces;
wherein the third indication is emitted light of a third color, the third color indicating a handicapped parking space; and
wherein the method further comprises the step of:
additionally generating the third indication using the annunciator, wherein the generation is facilitated by the processor, and wherein the third indication is generated to indicate availability of the handicapped parking space.

* * * * *